United States Patent
Sanders

(10) Patent No.: US 7,198,867 B2
(45) Date of Patent: Apr. 3, 2007

(54) ELECTROCHEMICAL GENERATION, STORAGE AND REACTION OF HYDROGEN AND OXYGEN

(75) Inventor: Nicholas A. Sanders, Norwich, VT (US)

(73) Assignee: Diffusion Science, Inc., Norwich, VT (US)

( * ) Notice: Subject to any disclaimer, the term of this patent is extended or adjusted under 35 U.S.C. 154(b) by 113 days.

(21) Appl. No.: 10/664,408

(22) Filed: Sep. 17, 2003

(65) Prior Publication Data

US 2004/0101740 A1   May 27, 2004

Related U.S. Application Data

(60) Provisional application No. 60/455,215, filed on Mar. 17, 2003, provisional application No. 60/411,443, filed on Sep. 17, 2002.

(51) Int. Cl.
*H01M 4/58* (2006.01)

(52) U.S. Cl. .................. 429/218.2; 420/900; 429/233; 429/219; 429/223; 429/231.5

(58) Field of Classification Search ..................... None
See application file for complete search history.

(56) References Cited

U.S. PATENT DOCUMENTS 3,577,324 A   5/1971   Patterson ..................... 204/20
3,607,787 A * 9/1971   Jung et al. .................. 502/331

(Continued)

FOREIGN PATENT DOCUMENTS

EP   0 897 745 A1   2/1999
JP   2003105640     9/2003

OTHER PUBLICATIONS

Henderson et al., (1984) "Coated Silica Shells: an Advanced Hydrogen Storage System" *World Hydrogen Energy Conference*, Conf. 340702 vol. 5, 1984, pp. 1415-1418.

(Continued)

*Primary Examiner*—Patrick Joseph Ryan
*Assistant Examiner*—Julian Mercado
(74) *Attorney, Agent, or Firm*—Proskauer Rose LLP

(57) ABSTRACT

An electrolytic apparatus for using catalyst-coated hollow microspheres to produce gases, store them, and to make them available for later use. The apparatus uses catalyst-coated hollow microspheres in reversible electrochemical processes and reactions, such as those used in conjunction with water dissociation, fuel cells, and rechargeable batteries. The apparatus can be used to manufacture and store hydrogen and or oxygen and to make them available for subsequent use as raw materials for use in electrochemical and chemical reactions or as a fuel and or oxidizer for a combustion engine. The apparatus can be used as a hydrogen-oxygen hermetically seal secondary battery. The apparatus can be used as a hydrogen storage portion of certain types of secondary batteries. Hydrogen and oxygen can be stored within hollow microspheres at moderate temperature and pressure, eliminating the need for expensive storage and handling equipment, and increasing the mobility of hydrogen-powered vehicles. Storage of hydrogen and or oxygen within the microspheres significantly reduces flammability and explosion concerns and resolves many fuel cell scalability issues.

79 Claims, 22 Drawing Sheets

U.S. PATENT DOCUMENTS

| | | | | |
|---|---|---|---|---|
| 3,632,496 | A | 1/1972 | Patterson et al. | 204/249 |
| 3,899,351 | A | 8/1975 | Maurer et al. | 136/34 |
| 4,211,537 | A | 7/1980 | Teitel | 48/191 |
| 4,302,217 | A | 11/1981 | Teitel | 48/180 |
| 4,336,226 | A | 6/1982 | Christensen | 422/109 |
| 4,430,391 | A | 2/1984 | Ovshinsky et al. | 429/40 |
| 4,431,561 | A | 2/1984 | Ovshinsky et al. | 252/184 |
| 4,487,818 | A | 12/1984 | Ovshinsky et al. | 429/44 |
| 4,623,597 | A | 11/1986 | Sapru et al. | 429/101 |
| 4,637,990 | A | 1/1987 | Torobin | 502/10 |
| 4,793,980 | A | 12/1988 | Torobin | 423/213.5 |
| 4,943,355 | A | 7/1990 | Patterson | 204/20 |
| 5,036,031 | A | 7/1991 | Patterson | 502/10 |
| 5,096,667 | A | 3/1992 | Fetcenko | 420/580 |
| 5,104,617 | A | 4/1992 | Fetcenko et al. | 420/588 |
| 5,135,589 | A | 8/1992 | Fetcenko et al. | 148/442 |
| 5,277,998 | A | 1/1994 | Furukawa et al. | 429/59 |
| 5,292,557 | A | 3/1994 | Olson | 427/437 |
| 5,318,675 | A | 6/1994 | Patterson | 204/86 |
| 5,348,822 | A | 9/1994 | Ovshinsky et al. | 429/223 |
| 5,376,474 | A | 12/1994 | Tadokoro et al. | 429/59 |
| 5,384,210 | A | 1/1995 | Furukawa | 429/59 |
| 5,387,478 | A | 2/1995 | Muta et al. | 429/59 |
| H1447 | H | 6/1995 | Linton | |
| 5,523,182 | A | 6/1996 | Ovshinsky et al. | 429/223 |
| 5,576,116 | A | 11/1996 | Sanchez et al. | 429/59 |
| 5,585,112 | A | 12/1996 | Unger et al. | 424/450 |
| 5,607,563 | A | 3/1997 | Patterson et al. | 204/269 |
| 5,632,871 | A | 5/1997 | Patterson | 204/275 |
| 5,635,038 | A | 6/1997 | Patterson | 204/222 |
| 5,814,108 | A | 9/1998 | Nanamoto et al. | 29/623.1 |
| 6,040,087 | A * | 3/2000 | Kawakami | 429/218.1 |
| 6,231,642 | B1 | 5/2001 | Shelby et al. | 95/45 |
| 6,315,981 | B1 | 11/2001 | Unger | 424/9.323 |
| 6,395,149 | B1 | 5/2002 | Palmgren | |
| 6,440,607 | B1 | 8/2002 | Harada et al. | 429/223 |
| 6,445,195 | B1 | 9/2002 | Ward | 324/684 |
| 6,445,196 | B1 | 9/2002 | White | 324/726 |
| 6,447,699 | B1 | 9/2002 | Bernard et al. | 252/521.2 |
| 6,447,942 | B1 | 9/2002 | Ovshinsky et al. | 429/27 |
| 6,447,953 | B1 | 9/2002 | Fierro et al. | 429/223 |
| 6,455,195 | B1 | 9/2002 | Matsuura et al. | 429/218.2 |
| 6,455,196 | B1 | 9/2002 | Kato et al. | 429/223 |

OTHER PUBLICATIONS

Battery Technologies, Inc., http://www.bti.ca/ramcon.htm, printed Dec. 8, 2001, 3 pages.

Colossus, http://colossus.chem.umass.edu/chandler/ch112/cells.htm, printed Dec. 8, 2002, 6 pages.

Kopera, John C., "Inside the Nickel Metal Hydride Battery", Texaco Ovonic Battery Systems LLC, 15 pages, Jul. 25, 2002.

Huanyubattery, http://hyper.net.cn/know/12.htm, printed Nov. 14, 2002, 3 pages.

Moltech, http://www.moltech.com/techdata/appmanuals/NiMH Application Manual.asp, printed Nov. 14, 2002, 22 pages.

Nelson, Robert, "The Basic Chemistry of Gas Recombination in Lead-Acid Batteries", JOM, http://www.tms.org/pubs/journals/JOM/0101/Nelson-0101.html, pp. 28-33, printed Oct. 30, 2002.

Panasonic, "Nickel Metal Hydride Handbook", 5 pages, Feb. 2002.

Saft Automotive, http://www.saftbatteries.com/automotive/uk/datasheet/d2_3.htm, printed Dec. 8, 2002, 2 pages.

Granta Design, http://www.grantadesign.com/solutions/metalfoams.htm, printed Nov. 25, 2002, 3 pages.

Munehisa Ikoma, Shinji Hamada, Nobuyasu Mishita, Yasuko Hoshina, Hiromu Matsuda, Kazuhiro Ohta, Tadao Kimura, "Development of a Nickel/Metal Hydride Battery (NI/MH) System for EV Application", The Electrochemical Society Proceedings vol. 94-27, pp. 370-380, (Sep. 14, 2002).

Lipka, Steven M. and Nechev, Kamen S., "Silver Oxide-Metal Hydride Cell: Preliminary Performance and Analysis", The Electrochemical Society Proceedings vol. 94-27, pp. 381-392, (Sep. 14, 2002).

* cited by examiner

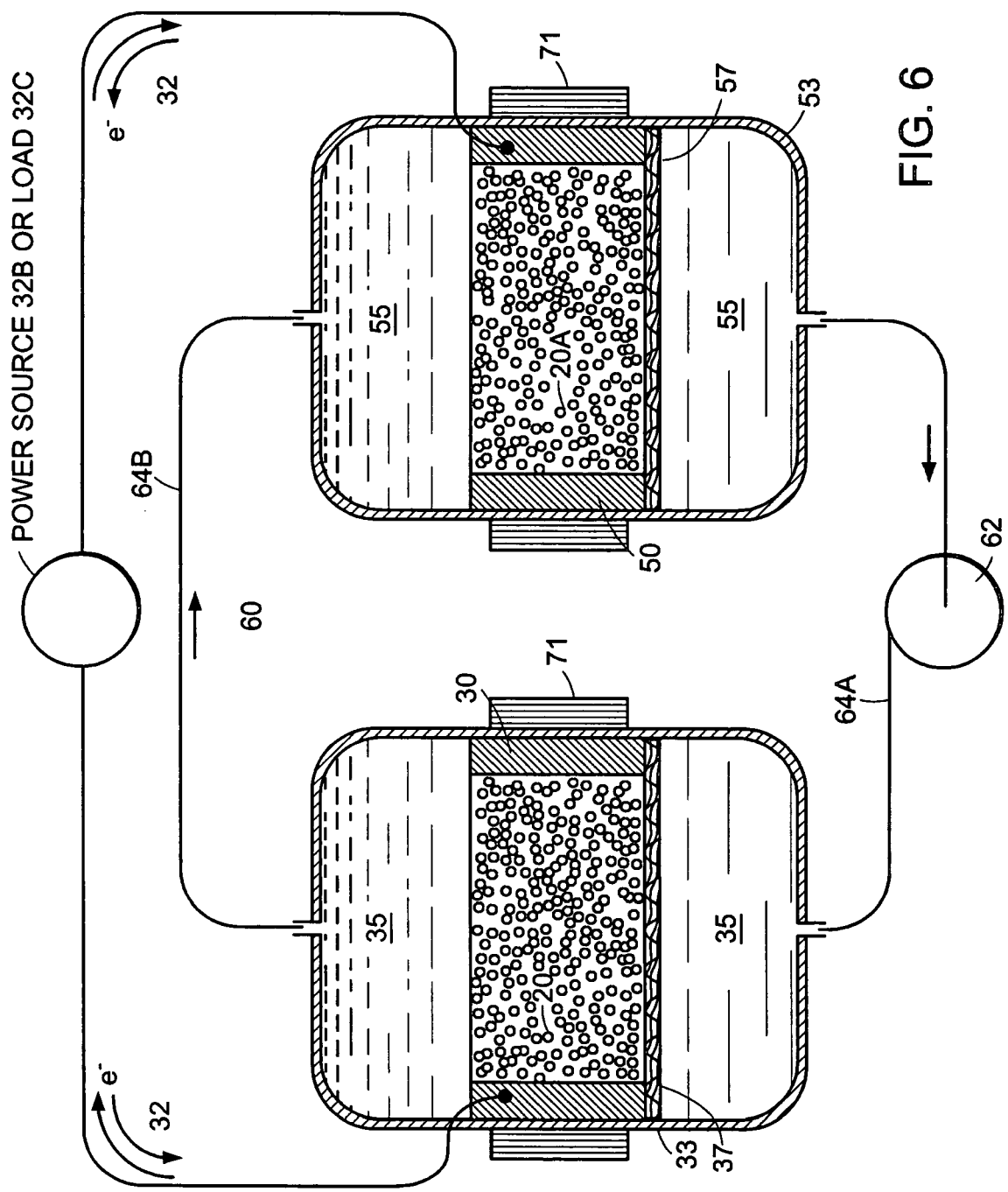

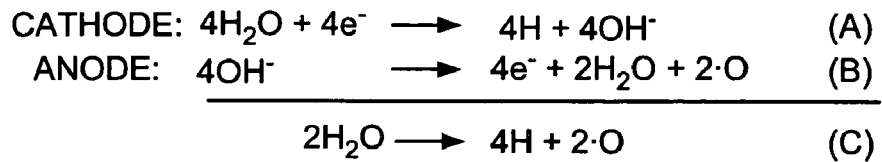
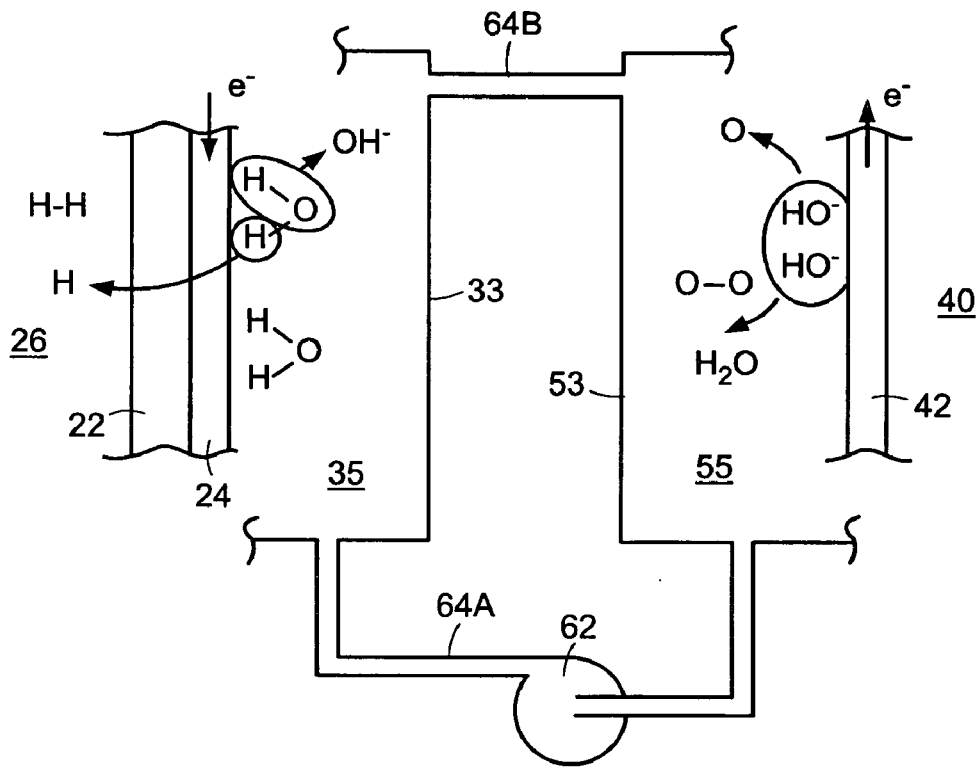
FIG. 8
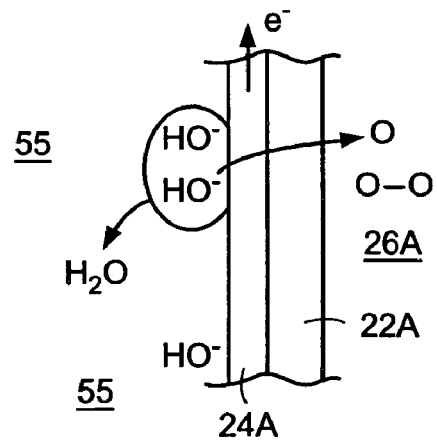
FIG. 8A

CATHODE: $2H_2O + 2 \cdot O + 4e^- \longrightarrow 4OH^-$ (D)
ANODE: $4H + 4OH^- \longrightarrow 2H_2O + 4e^-$ (E)
$4H + 2 \cdot O \longrightarrow 2H_2O$ (F)

ELECTROCHEMICAL GENERATION, STORAGE AND REACTION OF HYDROGEN AND OXYGEN

RELATED APPLICATIONS

This application claims priority to and benefit of U.S. Provisional Patent Application Ser. No. 60/411,443, filed Sep. 17, 2002, and U.S. Provisional Patent Application Ser. No. 60/455,215, filed Mar. 17, 2003. The contents of these applications are incorporated herein by reference.

FIELD OF THE INVENTION

This invention relates generally to the electrochemical generation, storage, and reaction of gases such as hydrogen and oxygen. This invention also relates to pressurized gaseous storage, fuel cells, secondary batteries, and electrolysers.

BACKGROUND OF THE INVENTION

Raw material gaseous feedstocks such as hydrogen and oxygen can be formed by the electrochemical dissociation of water. Fuel cells and secondary batteries (e.g., rechargeable batteries) can be used to combine or recombine hydrogen and oxygen to create electricity. Gaseous products such as hydrogen are also suitable for use as a gaseous fuel in many types of combustion engines. Other uses and vast markets exist for such gaseous products and raw materials.

Fuel cell and secondary battery technology has been hampered by a number of problems concerning the generation and storage of hydrogen or hydrogen containing compounds, and oxygen and oxygen containing compounds. Gaseous $H_2$ is extremely volatile and combustible, so storage of all but the smallest quantities of the gas is fraught with flammability and safety concerns. Generation and storage of gaseous hydrogen at moderate temperatures also requires the use of high-pressure generation and containment equipment. This equipment is extremely expensive and cumbersome to use. Generation and storage at moderate pressure requires the use of low temperatures and substantial refrigeration. Cooling requirements such as these are costly and substantially reduce the energy efficiency of such processes. In addition, the processes of generating and pressurizing degrade the quality of the produced hydrogen and oxygen gas. In cases where high purity hydrogen gas or its isotopes are required, additional costly manufacturing steps are required to remove contaminates.

Although hydrogen gas has a high energy density, its associated storage requirements result in a substantially reduced achievable energy per unit weight ratio. This issue in particular dramatically reduces the practicality and energy efficiency of hydrogen consuming fuel cells, secondary batteries, and engines, especially for mobile applications.

The generation and storage of oxygen and or oxygen containing compounds has had a similar analogous impact on the practicality and energy efficiency of fuel cells, secondary batteries, and engines, especially for mobile applications.

Certain fuel cell applications require three-phase gas diffusion electrodes to be in simultaneous contact with the gaseous fuel (typically hydrogen), the solid electrically-conductive portion of the electrode, and the electrolyte. The same requirement is placed upon an oxygen three-phase gas diffusion electrode. Typically, fuel cell oxygen is derived from ambient air. To operate efficiently the oxygen should simultaneously contact the solid electrically-conductive portion of the electrode, and the electrolyte. This design limitation of these types of fuel cells adversely affects their versatility and utility.

A further problem encountered by certain secondary battery and fuel cell applications involves the storage of hydrogen in metal hydrides. The amount of hydrogen that can be stored in these hydrides is less than 2% by weight. Commercial metal hydrides are now available. For example, metal hydride alloys (sometimes known as $AB_5$ hydrogen-absorbing compounds) are capable of storing about 1 gram of hydrogen per 65.5 grams of material, or only about 1.5% by weight.

A further problem encountered by certain fuel cell applications involves pressure differential problems largely caused by gravity in large-scale electrodes. As is well known in fuel cell art, a fuel cell can be used to combine hydrogen and oxygen gases to form water and electricity. The gas feedstocks are generally introduced on opposite sides of the fuel cell with a liquid electrolyte disposed between them. The electrolyte and gas feedstocks are generally separated by a porous electrode, which may include a membrane. In a common configuration, a porous electrode separates the electrolyte from the hydrogen supply, and another porous electrode separates the same electrolyte from the oxygen supply. The electrolyte is thus disposed between and in part contained by the two porous electrodes.

For economy of scale, it is generally desirable to increase the physical height of such fuel cell electrodes. As the height of these types of fuel cells is increased, the differential pressure across each porous electrode increases due to the difference in head pressure caused by the significantly different densities of the liquid electrolyte and feedstock gases on opposite sides of the porous electrode. The magnitude of the pressure differential that can be withstood by the electrode poses a practical limit to the height of such fuel cells and thus limits their overall capacity, efficiency, and scale. Horizontal orientation of such fuel cells results in other related problems. The pressure gradient developed down the electrolyte side of the porous electrode results in variable gas migration rates of each feedstock gas into the electrolyte. For a given gas supply pressure, the gas migration rate through the porous electrode and into the electrolyte is greater near the top of the vertical porous electrode than near the bottom, due to the reduced hydraulic back-pressure present at the higher elevation. This non-uniform gas flow through the electrode and into the electrolyte hampers the efficiency of the electrochemical cell, since not all portions of the electrode experience the same amount of gas flow. These problems have not been fully overcome and they apply equally to both the hydrogen and oxygen gas diffusion electrodes. Also, for fuel cells in which the electrolyte is circulated by external pumps, the electrolyte pressures between the electrodes can be much higher than the static pressure head alone. In these cases, the performance of the gas diffusion electrode can be even more greatly impacted by pressure differential or balancing problems.

Further problems with certain types of secondary batteries such as metal hydride batteries relate to their limited energy (hydrogen) storage capacity. The capability to store additional energy within such batteries could reduce the number of required charging cycles and also allow them to provide energy output for extended periods of time.

What is needed is an apparatus and method for forming and efficiently storing high purity hydrogen gas (or its isotopes) that makes this produced gas easily and effectively available for later use as, for example, a fuel for combustion, as a feedstock to a fuel cell or secondary battery, or as a feedstock for nuclear applications. The hydrogen needs to be storable in a safe, lightweight, low pressure, moderate temperature apparatus that readily makes it available for use, without prolonged liberation times.

What is further needed is an apparatus and method for forming and efficiently storing high purity oxygen gas that makes this produced gas easily and effectively available for later use as, for example, an oxidizer for reaction or combustion, or as a feedstock to a fuel cell or secondary battery. The oxygen needs to be storable in a safe, lightweight, low pressure, moderate temperature apparatus that readily makes it available for use, without prolonged liberation times.

What is further needed is such an apparatus and method that eliminates the differential pressure problems encountered in many fuel cell applications. What is further needed is a way to increase the energy stored per unit weight ratio for fuel cells and secondary batteries.

SUMMARY OF THE INVENTION

The invention features a device for electrochemically producing and storing a high purity gas. In one configuration the device functions as an electrochemical cell including a chamber, an electrode current collector for a hydrogen half cell, a plurality of catalyst-coated hollow microspheres in direct electrical contact with the hydrogen electrode current collector and each other, and in fluid contact with an electrolyte. The electrochemical cell can also include an electrode current collector for an oxygen half cell and a plurality of catalyst-coated hollow microspheres in direct electrical contact with the oxygen electrode current collector and each other. These can be in fluid contact with an electrolyte. Each microsphere can include a plurality of different layers in different combinations, including the catalyst coatings that yield different desirable properties and promote various reactions. The catalyst coating can include one or more of palladium, nickel, and silver, which can catalyze the electrochemical conversion of hydrogen and/or oxygen to or from water.

Hydrogen and oxygen can be produced electrochemically using the invention. One or both of these can be accumulated and stored within hollows of microspheres. Each microsphere acts as a small-volume high-pressure containment vessel. Gas thus produced is of very high purity and can be stored at very high pressures within the microspheres, without using high-pressure containment equipment. This electrochemical pressurization technique is capable of producing gas pressures in the hollows in excess of thousands of pounds per square inch. Produced hydrogen can be used as a fuel or as a raw material in other reactions. Oxygen produced can be accumulated and used as an oxidizer or as a raw material in other reactions, or vented. The hydrogen and or oxygen can be used as reactants in rechargeable batteries. The electrolyte can be a potassium hydroxide solution. In some embodiments, the electrode current collector forms a chamber and the microspheres and electrolyte are disposed within the chamber. The microspheres are electrically interconnected with each other and the chamber. In some other embodiments, the hollow regions of the microspheres are charged with high pressure gas in a pressurizing step, by disposing the microspheres into a conventional high pressure gas environment. They can be stored for a period of time, and then discharged electrochemically. This can be conveniently accomplished by microspheres disposed in an electrochemical chamber environment.

Hollow regions of the microspheres pressurized with either hydrogen or oxygen can be liberated of gas using temperature control, controlled electrochemical reactions, and catalytic substances interior to the microspheres (substrate or base-material) and/or disposed on the interior walls of the hollow regions. The hydrogen or oxygen thus supplied can be used to feed combustion reactions, as feedstock to supply the electrochemical reactions (e.g., in situ) of a fuel cell or rechargeable battery, or for many other purposes.

One aspect of the invention includes a composite material assembly for reversibly transferring a gaseous element comprising a base material that is at least partially coated with a catalyst. The base material is at least partially permeable to the gaseous element and defines at least one hollow region for containing the element. Transfer of the gaseous element can include releasing or storing the gaseous element in the hollow, or both.

The catalyst coating can include nickel, palladium, silver, platinum, copper, gold, titanium, silicon, iron, aluminum, indium, gallium, niobium, tantalum, vanadium, molybdenum, tungsten, zirconium, cobalt, chromium, carbon, cadmium, beryllium, rhenium, rhodium, rubidium, or alloys formed from these materials. In some embodiments, a plurality of composite material assemblies can be sintered or welded together. The base material can have a size range of between 5 and 5000 microns, and it can be a microbubble. The microbubble can have a diameter of between 5 and 5000 microns. In different embodiments, the wall thickness of the composite material assembly can vary from 0.10 and 100 microns.

The composite material assembly can include aluminum, silicon, zirconium, carbon, and/or boron.

The composite material assembly can also be formed from a glass, such as vitreous silica, vitreous germania, vitreous boric oxide, titanium silicate, aluminosilicate, alkali silicate, alkaline earth silicate, alkaline earth germinate, alkali borate, borosilicate, alkali aluminosilicate, alkali galliosilicate, soda-lime silicate, alkali borosilicate, phosphate, natural, and various commercial grades and compositions. It can also be formed of a glass-ceramic material, which can be in the shape of a microbubble. Suitable glass-ceramic materials include lithium aluminosilicate, lithium silicate, lithium metasilicate, lithium disilicate, zinc silicate, and commercial.

The base-material of the composite material assembly can also be formed with ceramic materials, including alumina, zirconia, yttria, silica alumina, mullite, sillimanite, porcelain, and polycrystalline materials. These can also be in the form of a microbubble.

The coating of the composite material assembly can be formed using chemical vapor deposition, electroplating, electroless plating, sol gel, plasma-activated chemical vapor deposition, sputtering, and/or painting as a coating process.

The permeability of the composite material assembly can be controllably altered by pressure or temperature, and the rate of transfer of the gaseous element can be enhanced by surface modifications to the coating.

Another aspect of the invention features an electrode for reversibly transferring a gaseous element, the electrode including a plurality of composite material assemblies for reversibly transferring a gaseous element, comprising a base material that is at least partially coated with a catalyst. The base material is at least partially permeable to the gaseous element and defines at least one hollow region for containing the element. The plurality is at least partially electrically interconnected.

A hydrogen-absorbing material, such as a metal hydride, can be interspersed within the electrode. The catalyst coating of the electrode can include nickel, palladium, silver, platinum, copper, gold, titanium, silicon, iron, aluminum, indium, gallium, niobium, tantalum, vanadium, molybdenum, tungsten, zirconium, cobalt, chromium, carbon, cadmium, beryllium, rhenium, rhodium, or rubidium, or alloys thereof. The composite material assemblies can be sintered or welded together, or they can be combined to form a non-sintered matrix.

In some embodiments the gaseous element is hydrogen, in others is can be oxygen.

Yet another aspect of the invention features an apparatus for transferring a gaseous element. The apparatus comprises a plurality of composite material assemblies and include an at least partially catalyst-coated base-material. The base-material is at least partially permeable to the gaseous element and defines at least one hollow region for storage of the gaseous element. The plurality of composite material assemblies is at least partially electrically interconnected. The apparatus also includes an electrolyte that includes the gaseous element, and a power module that is in electrical communication with the plurality of composite material assemblies. The power module can induce electrochemical reactions involving the gaseous element, the catalyst, and the electrolyte, thereby causing the gaseous element to either accumulate in or be liberated from the hollow region.

Embodiments of this apparatus include a pressurizeable environment, such that a pressure of the gaseous element within the pressurizeable environment can be periodically adjusted to help the gaseous element to accumulate in or be liberated from the hollow region. The gaseous element can be hydrogen, and preferably, the base-material is at least partially permeable to hydrogen. In some embodiments the apparatus is an electrochemical half-cell.

The gaseous element can also be oxygen. In some embodiments transfer of a gaseous element is enhanced by chemical additions to the electrolyte.

In yet another aspect, the invention includes a gaseous storage rechargeable electrochemical cell comprising a housing, an electrolyte disposed in the housing and comprising a first gaseous element, and a first electrode disposed within the housing and in contact with the electrolyte. The first electrode includes a plurality of composite material assemblies, the assemblies including catalyst-coated base-materials that are at least partially permeable to the first gaseous element. These define at least one first hollow region for storage of the first gaseous element, and are at least partially electrically interconnected.

The rechargeable cell also includes a power module in at least partial electrical communication with the plurality of composite material assemblies, such that electrochemical reactions are induced at the first electrode involving the first gaseous element, the catalyst, and the electrolyte. These cause the first gaseous element to either accumulate in or be liberated from the first hollow region.

The electrochemical cell can also include a second electrode disposed within the housing, in a spaced relationship relative to the first electrode. The second electrode can include a second plurality of composite material assemblies, each including an at least partially catalyst-coated base-material that is at least partially permeable to a second gaseous element. These can define at least one second hollow region for storage of the second gaseous element, and should be at least partially electrically interconnected. A power module can be in electrical communication with the second plurality.

In embodiments of the electrochemical cell, the first gas can hydrogen, and the second gas can be oxygen. The electrochemical cell can be a rechargeable battery.

In some embodiments the first electrode comprises a mixture including nickel as a major component. The mixture can be disposed on an at least partially electrically conductive interconnected substrate that is in at least partial electrical communication with the power module. The second electrode can also include nickel as a major component, and this mixture can be disposed on an at least partially electrically conductive interconnected substrate that is in at least partial electrical communication with the power module.

In other embodiments the second electrode includes an oxygen electrode disposed within the housing in a spaced relationship relative to the first electrode and the housing, the oxygen electrode on one side being exposed through an electrolyte to the first electrode. On the opposite side this electrode can be exposed to gaseous oxygen, for example, through a supply port in the housing. The oxygen electrode can also include an electrode mixture that contains an oxygen reduction catalyst that is present in an electrochemically active amount. This mixture can be disposed on or within an electrically conductive interconnected substrate that is in electrical communication with the power module.

In some embodiments the second electrode is exposed to ambient air. A hydrogen-absorbing material, such as a metal hydride, can be inter-dispersed with the first electrode. Transfer of the gaseous element can be enhanced by chemical additions to the electrolyte. In other embodiments, a rate or magnitude of side surface reactions at the electrochemical cell can be controllably altered by chemical additions to the electrolyte, or by adjustment of a cell pressure or temperature.

The electrochemical cells of the invention can be electrically connected to each other in parallel or series to provide or receive an increased amount of current or voltage. Such cells can use a basic electrolyte, such as an alkali metal hydroxide, e.g., potassium hydroxide. The electrolyte can be in the form of a liquid, a gel, or a solid. Some embodiments use an acidic electrolyte, which can be in the form of a liquid, a gel, or a solid. Certain electrolytes used with the electrochemical cell can be circulated within the housing using a pump.

The electrochemical cell can include a conductive matrix comprising at least one composite material assembly in contact with or comprising at least one of conductive foam, metal wire mesh, perforated metal foil, and metal gauze. The conductive matrix can include a conductive material additive such as nickel, copper, carbon, silver, or alloys, mixtures, or compounds thereof. Constituents of the conductive matrix can be sintered or welded together.

In some embodiments of the electrochemical cell, the operating temperature within the housing is periodically maintained between −50 degrees Celsius and 1000 degrees Celsius. The operating pressure within the housing can be periodically maintained between 1 Bar and 2000 Bar, and the housing can include a demister.

Yet another aspect of the invention features a method of transferring a gaseous element, including the steps of providing a composite material assembly that includes a base-material at least partially coated with a catalyst and at least partially permeable to the gaseous element. The base-material defines one or more hollow regions. The method also includes transferring a gaseous element into or out of the hollow region.

In embodiments of the method, the composite material assembly is a part of an electrochemical cell, and can comprise hollow glass microspheres at least partially permeable to the gaseous element. The composite material assembly can be at least partially disposed in an electrolyte.

Transfer of the gaseous element can be facilitated with an electron source or sink, and the permeability can be controllably altered by chemical additions to the base-material. Operational changes to the pressure and/or temperature about the composite material assembly can also be used to affect the permeability. In some embodiments, the method includes enhancing the rate of the gaseous transfer by surface modifications to the coating.

In some embodiments, electrical energy is generated by transfer of the gaseous element from the hollow regions, and subsequent consumption of the gaseous element in electrochemical reactions. Alternatively, electrical energy can be consumed by transfer of the gaseous element to the one or more hollow regions, subsequent to the gaseous element being generated in an electrochemical reaction.

Electrical energy and water can be generated by the method when a cell is operated to consume hydrogen and oxygen, which are consumed in electrochemical reactions. This hydrogen and oxygen can be provided from the hollow regions. Alternatively, electrical energy and water can be consumed using the method, such that at least one of hydrogen or oxygen is generated in an electrochemical reaction and accumulated in one or more hollow regions.

The composite material assembly used in the method can be pressurized with gaseous hydrogen to an absolute pressure between 1 Bar and 2000 Bar. Embodiments include pressurizing a composite material assembly with gaseous oxygen to an absolute pressure between 1 Bar and 2000 Bar. In some embodiments, the operating absolute pressure is periodically maintained within electrolyte surrounding the composite material assembly at a selected value between 1 Bar and 2000 Bar.

In some embodiments periodically induced electrochemical reactions of the method are controlled by periodic electrical communication between an electrode and a power module.

BRIEF DESCRIPTION OF THE DRAWINGS

The foregoing discussion will be understood more readily from the following detailed description of the invention, when taken in conjunction with the accompanying drawings, in which:

FIG. 6 illustrates an embodiment comprising an electrochemical cell that includes hollow catalyst-coated microspheres in both half-cells;

FIG. 8 illustrates an electrochemical process as applied to the electrolysis of water;

DETAILED DESCRIPTION

Figure 1:
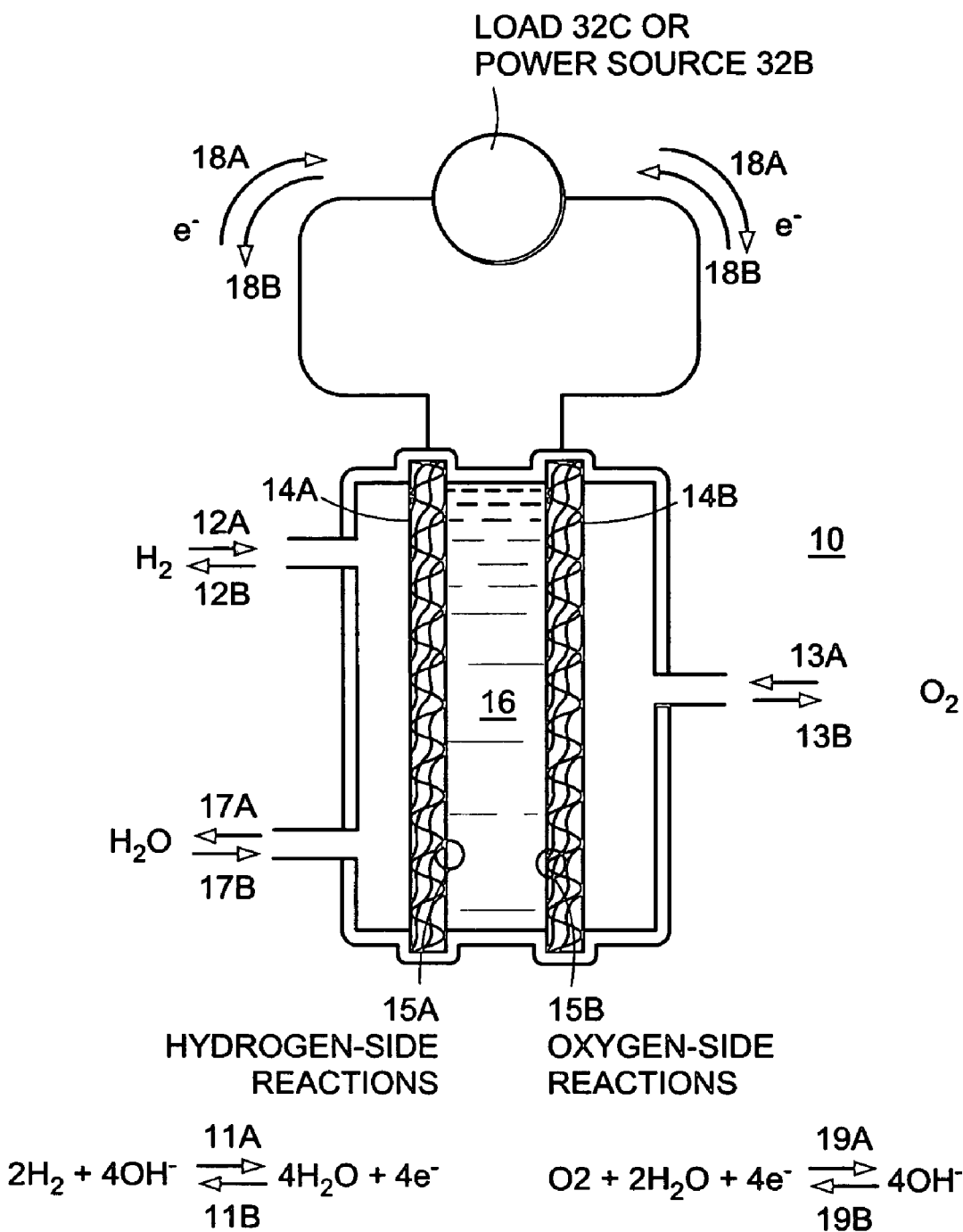
FIG. 1 is a representation of a prior art fuel cell/electrolyser apparatus.

FIG. 1 illustrates a prior art fuel cell and electrolyser apparatus 10. As shown, hydrogen 12A and oxygen 13A are combined to create water 17A and electricity 18A when the device is operated as a power producing fuel cell. Also shown in FIG. 1 are the fuel cell half-cell reactions 11A and 19A. A simplified form of the equation for the overall reaction is:

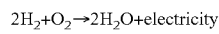

$$2H_2 + O_2 \rightarrow 2H_2O + \text{electricity}$$

Hydrogen 12A and oxygen 13A gases are introduced to the device 10 adjacent two porous electrodes, porous anode 14A and porous cathode 14B, respectively. The electrodes, for example, can be made of porous carbon. The gases migrate through their respective porous electrodes (14A and 14B) and meet and react with the electrolyte solution 16 in the three phase reaction zones 15A and 15B of each electrode. Each three phase reaction zone comprises the respective electrode catalyzed to promote a specific half-cell reaction, the respective gas, and the electrolyte. The electrolyte can be, for example, a potassium hydroxide solution and the catalyst for each electrode can comprise platinum. In this fuel cell mode of operation electrical current 18A is produced by the electrochemical half-cell reactions 11A and 19A, and can power load 32C.

When properly catalyzed, the electrochemical half-cell reactions are reversible. Thus, application of electrical current 18B of the opposite polarity by power source 32B to electrodes 14A and 14B can reverse the fuel cell reactions. This results in the electrolytic production of hydrogen 12B and oxygen 13B from supply water 17B, according to the following simplified equation.

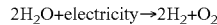

$$2H_2O + electricity \rightarrow 2H_2 + O_2$$

In this mode of operation the device functions as a water electrolysis device, sometimes known as an electrolyser. The electrochemical half-cell reactions are shown in FIG. 1 as 11B and 19B. Taking both modes of operation into account, the device is sometimes referred to as a reversible fuel cell. As shown, liquid electrolyte is present on one side of each porous electrode and a gas is present on the other side. This electrolytic cell thus exhibits the problems discussed above, including pressure differential and head problems. This electrolytic cell also possesses no significant gas storage capability, either in the electrolyte or electrodes. The cell relies on the forced transport of gaseous reactants and or products to and from the electrodes. Embodiments described below are compared with the fuel cell and water electrolysis device of FIG. 1. The electrolyser and fuel cell devices described above are established technologies. The invention also has application to other types of electrical apparatuses. For example, secondary batteries such as the nickel metal hydride (NiMH) and silver oxide (AgO) based batteries can also benefit from the invention. The stored energy capacity of these types of basic electrolyte secondary batteries is limited by the amount of hydrogen that can be stored. Therefore, they must be frequently recharged.

Figure 2:
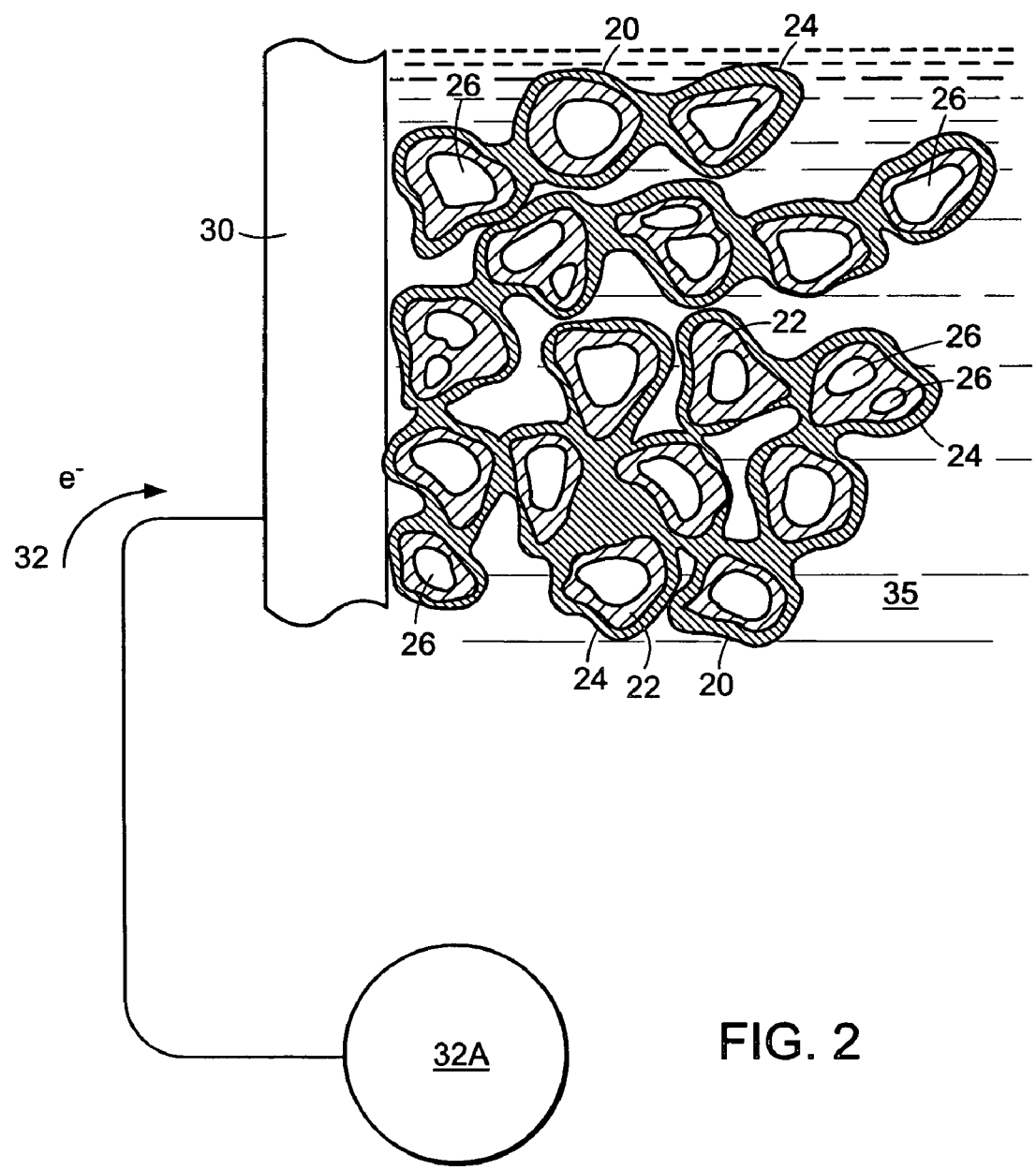
FIG. 2 illustrates some of the general principles of the invention.

The present invention overcomes problems of the prior art described above. An overview of an embodiment is shown in FIG. 2, which illustrates a portion of an electrochemical half-cell. In this embodiment, hydrogen is electrochemically formed and stored by electrochemical reactions at the surface of catalyst coated base-material particles (or substrates) 20, which form a composite material assembly. These reactions involve the catalyst 24, the electrolyte 35, and electrons 32 from a power module such as electron source 32A. The catalyst can be any catalyst that promotes the desired electrochemical reactions and has an affinity for and is permeable to hydrogen. The base-material 22 is a key element of this invention. Each base-material particle or substrate contains on its interior at least one hollow region 26. For example, the base-material or substrate can be a hollow microsphere (sometimes known as a microballoon, microbubble, or microsphere). The catalyst coating and the microsphere substrate material together can form the composite material assembly, which should be at least partially permeable to the gaseous reactants, e.g., hydrogen. Certain types of glasses such as borosilicate glass are known to be permeable to hydrogen at certain pressures and temperatures.

As shown in FIG. 2, large numbers of the microspheres can make up the bulk hydrogen storage material. As illustrated and as described herein, composite material assemblies including these microspheres can be used to reversibly transfer a gaseous element to or from a hollow region, thus storing or releasing the gaseous element. The catalyst coating 24 of the hollow microspheres 20 is in direct electrical contact with the electrode contact 30 of the electrolytic half-cell, which in turn is connected to an electron source 32A (e.g., a DC power supply). The atomic hydrogen formed accumulates in and passes through the catalyst coating 24. Large concentrations of hydrogen can form in the coating as the reaction proceeds, causing hydrogen to diffuse through the hydrogen permeable wall 22 of the spherical substrate 20. Modification of the surface characteristics of these coatings (e.g., texture, roughness) can enhance the gas transfer characteristics (such as rate) through the assembly.

The hydrogen accumulates in and can be stored as gas in the hollow region 26 of the microsphere 20. As the reaction progresses, gas pressure in the hollow region continues to build. Techniques facilitating storage of the hydrogen within the hollow region 26 of the microsphere, and subsequent release of the hydrogen from the hollow region 26 of the microsphere are described below. The electrically interconnected catalyst coated hollow microspheres 20 (i.e., the composite material assembly) can be used as the anode in a fuel cell reaction. Hydrogen stored in the hollow region 26 of the microspheres can be used to fuel this reaction.

These catalyst coated hollow microspheres can be used to replace or supplement metal hydrides used with fuel cells and secondary batteries. Use of these catalyst-coated gas chargeable microspheres result in an increased energy storage capacity. The invention allows energy (e.g., hydrogen) storage densities that can greatly exceed the near-term U.S. Department of Energy goal of 6%, per unit weight.

Figure 3:
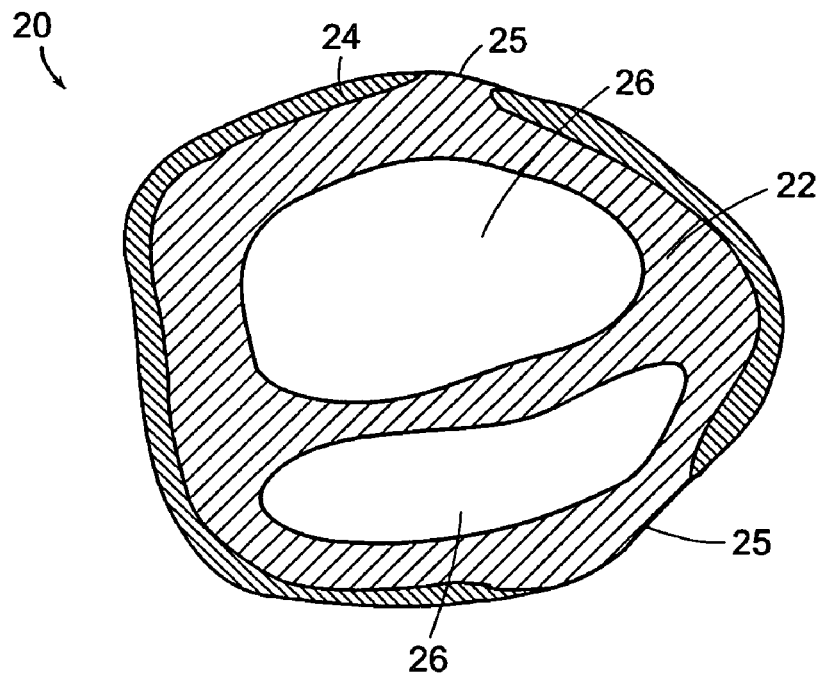
FIG. 3 is an illustration of a base-material particle with internal hollow regions and a catalyst layer for promoting reactions which can be used for the formation, storage, and liberation of a gases such as hydrogen or oxygen.

FIG. 3 illustrates a base-material particle 20, which when operated according to the principles of the present invention causes formation, storage, and liberation of gases such as hydrogen or oxygen. This composite material assembly comprises internal hollow regions 26, a catalyst layer 24 for promoting desired reactions, and the base material itself 22 which forms the walls around and defines the internal hollow regions 26. The base material 22 is selected according to its ability to allow the diffusion or permeation of selected gases to and from the hollow regions 26. The permeation rate is determined by the intrinsic material properties of material 22. The material 22 is also selected based upon its material strength at the desired operating pressure and temperature.

The hollow regions 26 can be of any number and shape, and either interconnected or not, providing they are completely defined by the material 22 and completely enclose a region with no pin holes or other passageways to the exterior of the particle. Many possible material choices can be used for material 22, including many glasses and ceramics. For example, borosilicate glass has mechanical strength and diffusion properties at temperatures between −25 C. and 200 C., which make it a useful material for hydrogen storage in accordance with the present invention. As another example, yttria stabilized zirconia ceramic has mechanical strength and diffusion properties at temperatures between −25 C. and 200 C. which make it a useful material for oxygen storage in accordance with the present invention. Other suitable materials are described below.

The physical dimensions of the base-material particle 20 and hollows 26 contained therein can be of any reasonable size. These sizes are typically dictated by particle manufacturing constraints. Particle sizes, and thus the size of the hollows, will range from a few microns to a few millimeters. The minimum wall thickness (between an inside hollow region 26 and the outside surface of particle 22) should be such that it will contain the gas pressures associated with the operation of the invention describe herein over the prescribed operating temperature range. These parameters are described in more detail below.

Different methods and techniques for manufacturing the base-material particles of the present invention can be used, providing the resulting particles are of an appropriate, acceptable quality, and include the required hollow regions. Physical porosity between the interior of a hollow region and the outside of the microsphere is undesirable because it does not allow the hollow to be significantly pressurized. Such techniques vary greatly according to the type of substrate material, e.g., glass or ceramic. For example the hollow glass microspheres can be manufactured according to known technology, such as described in U.S. Pat. No. 4,726,829. The ceramic base-material substrate can be manufactured by a sol-gel process. The catalyst coating 24 can be applied to the outside surface of base-material particle 22. It should be selected based on its ability to catalyze particular reactions at the particle surface, and for its ability to allow the accumulation and/or permeation of the gaseous element.

The catalyst coating should be applied to large portions of the particle surface and should be intimately bonded to the surface. Coverage of 100% is desirable, although some surface portions 25 of particle 22 can be uncoated. If the catalyst coating is discontinuous and covers less then 100% of the particle surface, the area of the coated portions should be greater than the square of two times the maximum wall thickness. For example, if the maximum particle wall thickness is 1 micron the desired minimum area of coating coverage on a coated portion would be 4 square microns. The reason for this engineering guideline rest with the randomness of gas diffusion in the base material 22. For example, coated portions of the substrate with less surface area can exhibit gas evolution on the uncoated outside surface which will adversely affect gas transfer to the internal hollow regions, and any subsequent desired pressure increase.

The catalyst coating can be a composite of several different catalysts and coatings. Useful materials and combinations include silver and palladium in a 25/75 weight ratio, although other metallic materials and ratios can be used. The coating can also comprise other suitable materials such as nickel, platinum, rhodium, various Group VIII and Group IB metals from the Periodic Table, and other metals, alloys and conductors possessing the requisite electrocatalytic properties. In some embodiments, the catalyst comprises at least one of nickel, palladium, silver, platinum, copper, gold, titanium, silicon, iron, aluminum, indium, gallium, niobium, tantalum, vanadium, molybdenum, tungsten, zirconium, cobalt, chromium, carbon, cadmium, beryllium, rhenium, rhodium, rubidium, or alloys thereof.

Various combinations and ratios of the materials listed above can be used and are also within the scope of the invention. For example, a coating of nickel or nickel, silver, and palladium would be a good catalyst choice for storing hydrogen according to the present invention. As another example, a coating of silver, or silver and palladium would be a good catalyst choice for use with oxygen. The thickness of the catalyst coating can vary from point to point on the surface of the particle.

A typical coating thickness can be less then 1 micron. Various methods and techniques for applying catalyst coatings to the base-material particles of the present invention can be used provided the resulting catalyst coating provides the selected catalyst coating properties desired. Possible coating techniques include CVD, electroplating, electroless plating, sol-gel, immersion plating, sputtering, plasma-activated chemical vapor deposition, painting, etc.

Figure 3A:
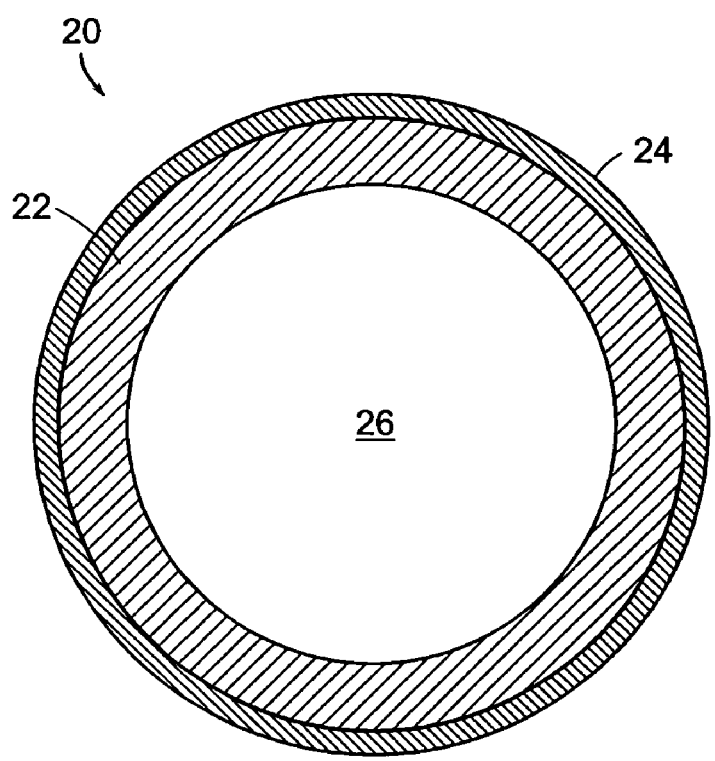
FIG. 3A is an illustration of a hollow microsphere that can be used for the formation, storage, and liberation of a gas such as hydrogen.

FIG. 3A illustrates an embodiment of a base-material particle comprising a hollowed microsphere that can be used in a device for hydrogen or oxygen formation, storage, and/or liberation. The composite material assembly includes hollow microsphere 20 comprising a closed spherical substrate 22, which can be made of a glass or ceramic. Embodiments include microsphere/microbubble wall thicknesses of between 0.10 and 100 microns are suitable for use with the invention. Embodiments also include hollow microspheres having a wall thickness ranging from several tenths of a micron to 1 to 2 microns. One type of glass suitable for use with hydrogen as a working gas is a borosilicate glass such as thin H50/10,000 EP glass microbubbles, sold by 3M Company of St. Paul, Minn. The glass section should be uniform and defect free. The glass microsphere is hydrogen-permeable under certain operating conditions, as discussed below. Uncoated hollow glass microspheres of this type have been used directly to store pressurized hydrogen gas as described in U.S. Pat. No. 4,211,537. In addition, as disclosed in U.S. Pat. No. 6,231,642, the glass microspheres can be doped with certain metals in order to modify or control diffusion rates of hydrogen.

The composite material assemblies can include microspheres with a diameter of 10–200 microns, although they can have a diameter as large as several hundred microns or as small as a few tenths of a micron. Embodiments include base materials having a size range (diameter) of between 5 and 5000 microns. Glasses formed of vitreous silica, vitreous germania, vitreous boric oxide, titanium silicate, aluminosilicate, alkali silicate, alkaline earth silicate, alkaline earth germinate, alkali borate, borosilicate, alkali aluminosilicate, alkali galliosilicate, soda-lime silicate, alkali borosilicate, phosphate, natural, and commercial grades can be used with the invention.

Alternatively, other materials, such as silica-alumina ceramic microspheres (available from 3M Company, St. Paul, Minn.) can be used for hydrogen storage. Other suitable ceramic and glass-ceramic materials include alumina, zirconia, yttria, silica alumina, mullite, sillimanite, porcelain, polycrystalline materials, lithium aluminosilicate, lithium silicate, lithium metasilicate, lithium disilicate, zinc silicate, and various related commercial ceramic supplies and materials. Other useful additives include aluminum, silicon, zirconium, carbon, and boron. Still other materials such as yttria stabilized zirconia or ceria ceramic microspheres can be used for oxygen formation, storage and/or liberation. A concern with ceramic hollow microspheres is porosity and the ability for hydrogen or oxygen to permeate the spherical wall at acceptable rates. Excessive physical porosity between the interior (a hollow region) and the outside of the microsphere is undesirable because it keeps the hollow from becoming significantly pressurized.

The hollow microspheres can be coated with a catalyst that has an affinity for electrolyzing either the oxygen or hydrogen reactions. Oxygen or hydrogen can absorb into and permeate through the catalyst. The choice of catalyst material and its thickness can be the same as described with respect to the catalytic coating of the particle of FIG. 3. As mentioned previously, useful catalytic materials for either oxygen or hydrogen reactions include silver and palladium in a 25/75 weight ratio, although other metallic materials and ratios can be used. The coatings can also comprise other suitable materials such as nickel, platinum, rhodium, various Group VIII and Group IB metals from the Periodic Table, and other metals, alloys and conductors possessing the requisite electrocatalytic properties. Various combinations of the materials listed above can be used and are also within the scope of the invention.

The hollow microsphere base-material 22 can be coated with a suitable material that forms a catalytic coating 24 about its exterior surface. Coating thicknesses of about 0.1 to 2 microns can be used, although thicknesses that are considerably thinner or thicker can be used. The coating can be continuous and contiguous about the surface of the microsphere. Patterned metal coatings can also be used. However, as described above, the minimum area requirements of the coated portion should be observed. The hollow microsphere base-material 22 can be catalyst-coated via a CVD process or electroplating process, although the other application techniques described above can be used. The catalyst coating 24 forms a nearly continuous, but gas-permeable surface, about the hollow microsphere base-material 22. Thus, the absorption ability and permeability of the metal coating 24, and the permeability of the hollow microsphere base-material 22, allows gas to accumulate in and fill the hollow region 26 of the microsphere 20 while operating under conditions that charge the device. Conversely, these permeability characteristics also allow gas to be liberated from the hollow region 26 of the microsphere 20 when operating under conditions that discharge the device. That is, the characteristics of the catalyst-coated hollow microspheres allow significant quantities of gas to be rapidly absorbed or liberated by the hollow region 26 of the hollow microspheres 20, under the proper operating conditions.

Figure 3B:
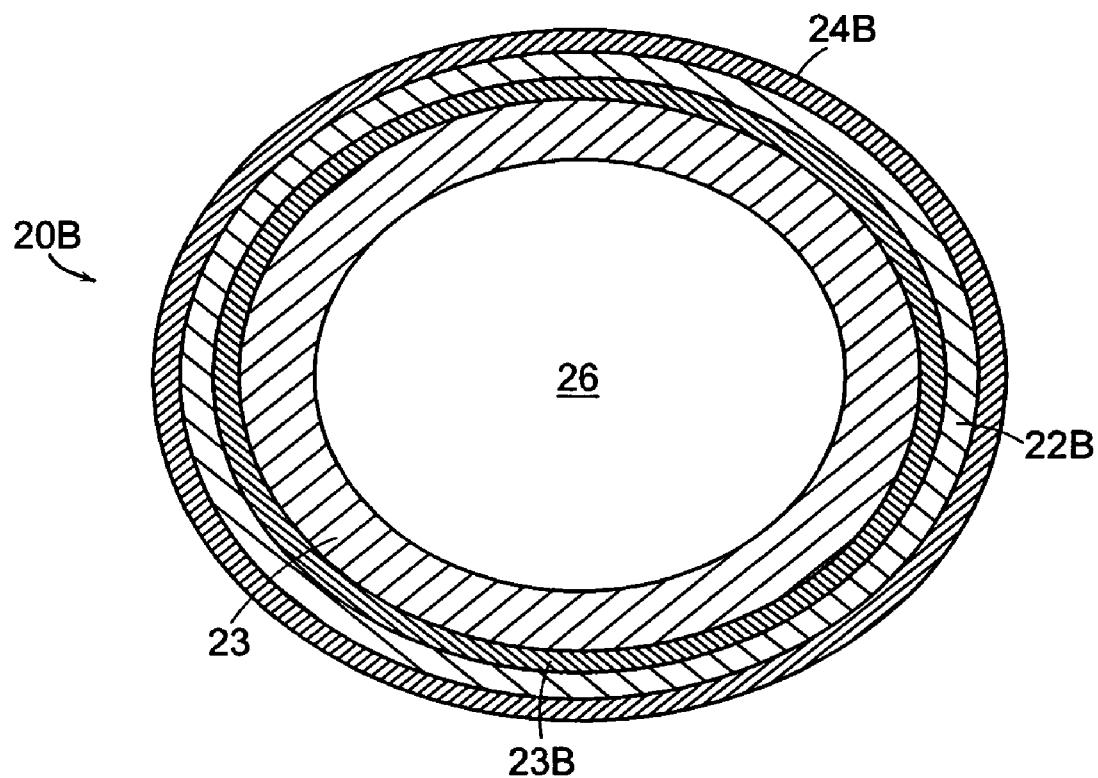
FIG. 3B shows another embodiment of a microsphere with a hollow region and with improved storage and release capabilities.

As shown in FIG. 3B, in another embodiment, catalyst coated hollow microsphere 20B can be fabricated as a multi-layer structure. Starting with a porous hollow or solid ceramic microballoon base-material 23, a coating comprising an interior catalytic layer 23B can be applied to the microballoon base-material 23. The choice of material and thickness of the interior catalyst coating can be the same as described for the catalytic metal coating of the microsphere of FIG. 3. After interior catalytic layer 23B is applied, a coating of glass 22B can be applied. Typically, a borosilicate glass or modified glass is used, as described above. The thickness can be from several tenths of a micron to 1 to 2 microns and should be relatively uniform and defect free. The glass layer can be deposited using a CVD process or other known method. After glass coating 22B is applied, catalyst coating 24B can be applied. The choice of material and thickness of the catalyst coating can be the same as described for the catalytic coating of the base-material particle 22 of FIG. 3. Complete coverage of the outside of the particle 22 with the catalyst coating is desirable, as discussed above. If the coverage is less than 100% the same rule for the desired minimum coverage area as discussed above applies. This embodiment provides an additional interior catalytic layer 23B on the interior of the glass wall 22B.

The interior catalytic layer 23B can positively enhance the inward and outward permeation of hydrogen while maintaining the controlled permeation storage benefits of glass. If diatomic hydrogen gas is stored in the hollow region 26 of the microsphere, then the presence of the interior catalytic layer 23B can promote the conversion of the hydrogen molecule to and from hydrogen atoms. In some cases the hydrogen atoms, due to their smaller size and higher mobility, may more easily diffuse and migrate through the applied glass wall, thus increasing the rate at which hydrogen can be stored and removed from the interior of the hollow glass microsphere.

Further, various combinations of materials and different layer combinations can be used to manufacture the microspheres. For example, since the permeability of glass to hydrogen is readily influenced by temperature, and temperature of the system is easily controlled, in some embodiments it is desirable to establish an outer glass layer for ready control of the hydrogen migration rate. Structuring of the layers can be designed to promote or retard hydrogen migration rates, as desired. Since certain materials cause the dissociation of hydrogen molecules into hydrogen atoms, these can be strategically placed within certain layers of the microspheres to establish the desired migration characteristics. This is effective in part because the migration rate of hydrogen atoms is greater than the migration rate of hydrogen molecules (atoms in diatomic form). Embodiments also include altering system pressure (e.g., an external system pressure) to control the permeability of the composite assembly, or to help control the rate of gas migration through the microsphere. In some embodiments, pressures external to the composite material assembly of between 1 and 2000 Bar can be utilized to help control gas transfer rates into and out of the hollows. Such techniques can be used, e.g., in conjunction with hydrogen or oxygen storage in the microsphere hollow.

This feature can be used to influence the migration rate of hydrogen both into and out of the hollow microsphere 20. For example, the presence of an internal catalyst coating, such as silver/palladium, promotes the separation of diatomic hydrogen ($H_2$) into hydrogen atoms. These hydrogen atoms can then more easily migrate out of the hollow region 26, through the spherical substrate 22 (e.g., glass, graphite, ceramic, etc.), to the surface of the microsphere, for example, to participate in electrochemical reactions. Similarly, layers within the microspheres can be structured to achieve the desired hydrogen inward-migration characteristics. For example, combinations of metal coating features such as porosity, thickness, interstitial spaces, doping materials and concentrations, and residence time can be designed to control the molecular/atomic/ionic form of the hydrogen as it migrates through the different layers of the microsphere. The form of the hydrogen can be changed as it passes through the different layers of the microsphere, either in whole, or in part.

Similar techniques can also be applied to the internal and middle layers of the hollow microspheres (e.g., FIG. 3B) to obtain the desired layer properties, and gas (e.g., hydrogen) flow and storage characteristics and capabilities. In some embodiments, strategic placement of interstitial spaces within layers, such as glass layers, can be used to manipulate the microsphere characteristics. The interstitial spaces can promote the outward migration of diatomic (molecular) hydrogen from the hollow region 26, making it more readily available to participate in electrochemical reactions at the outer surface of catalytic coating 24.

In other embodiments, different materials have different pressure containment capabilities. These can also be layered about the microsphere, to customize their collective properties. Various materials can be used with the microspheres, including ceramics such as Mullite® (Coors Porcelain Company, Golden, Colo.). Plated ceramic and carbon/graphite microspheres are commercially available. The ceramic microsphere 23 can be porous and allow hydrogen gas to freely pass into and out of its interior hollow portion. A solid, porous ceramic or carbon or graphite substrate 23 can also be used. Some of these materials are also available from Powdermet, Inc. of Sun Valley, Calif. In these cases the outside coating layers could form the required gas diffusion walls required for pressurizing.

Another embodiment uses microsphere layers to provide purified gas. The migration of gases, such as hydrogen and hydrogen isotopes, through the microspheres results in gas products that are substantially free of impurities. For example, hydrogen gas evolved from microspheres can be used to supply markets with high purity requirements.

Figure 3C:
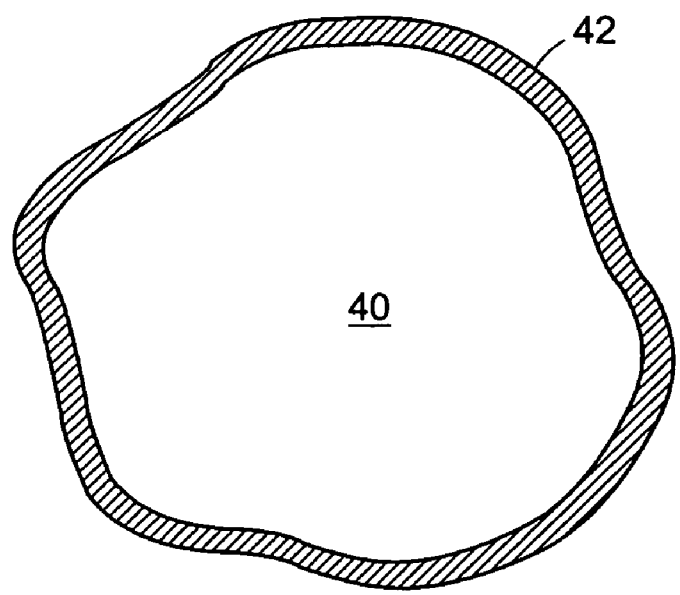
FIG. 3C shows a solid catalyst coated microsphere that can be used in electrode fabrication.

Illustrated in FIG. 3C is a catalyst coated solid particle. It consists of the material substrate 40, which may be a solid glass or ceramic material and a catalyst coating 42 applied to its outside surface. This particle is not useful in the present invention for gas accumulation or storage, but rather, pluralities of this particle are useful in several embodiments of the present invention to catalyze certain electrochemical reactions and to provide large surface area for reactions. Useful coating materials include silver, palladium, platinum, nickel, and various combinations, alloys, and coating layers thereof. The metal coating thickness can be 0.1 to 2 microns, although considerably thinner or thicker coating thicknesses can also be employed. In one embodiment, solid microsphere 40 diameters are about 1 micron to about 300 microns. Metal coated microspheres of this type are commercially available, for example, silver coated hollow-ceramic microballoons (Cat. No. 1-0080) from Powdermet, Inc. of Sun Valley, Calif.

Figure 4:
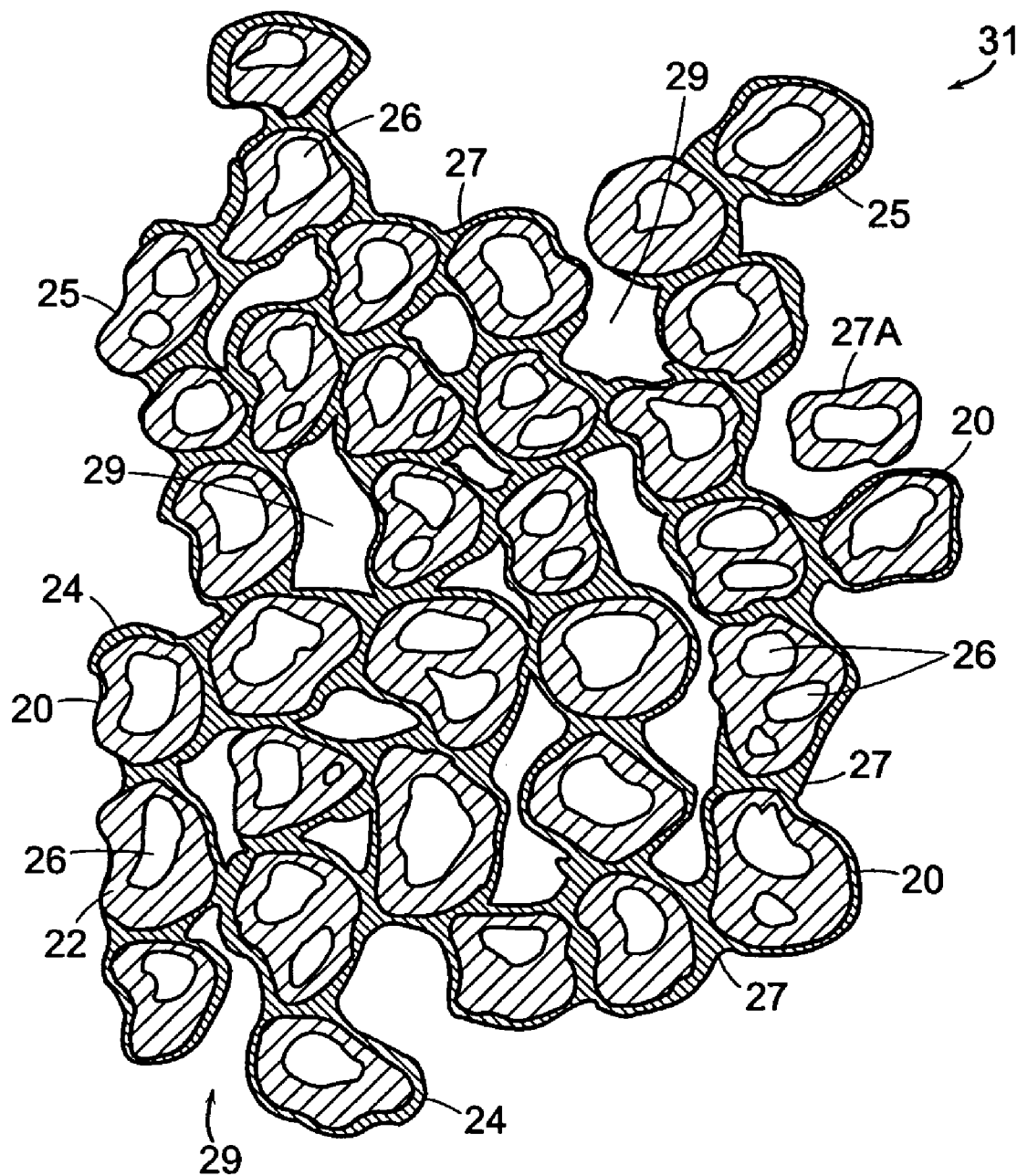
FIG. 4 shows the base-material particles welded or sintered together into an electrode.

FIG. 4 represents a sectional view of a portion of an electrode 31 comprising a plurality of catalyst coated base-material particles 20. These composite material assemblies can each comprise an at least partially catalyst-coated base-material, the base-material at least partially permeable to the gaseous element to be transferred. They define at least one hollow region for containing the gaseous element and should be at least partially electrically interconnected. The material choices for particles 20 depend on the gas to be charged and discharged and the desired electrochemical reactions. Electrode 31 can be either a cathode or anode depending upon the specific electrochemical cell being configured. As described in FIG. 3 base-material particles 20 are comprised of base-material 22 containing hollow regions 26 and coatings 24. The coatings may not cover 100% of the base-material particles; uncoated areas 25 may existed on the particle surfaces. The plurality of base-material particles are welded or fused together at contact points by welded zone 27. The manufacturing of weld joints can be done by any known technique, such as sintering at elevated temperatures. Composite material assemblies comprising catalyst coated base-materials of the invention can be sintered or welded together using various techniques. It is desirable to have all of the base-material particles interconnected, e.g., by a welding process. This interconnection will ensure good electrical contact to the base-material particles. In addition to ensuring good electrical contact, the fixed matrix establishes clear void spaces 29 for the electrolyte to disperse in and fill. Good electrical and electrolyte contact to all of the particles is necessary for the electrochemical charging and discharging processes to proceed effectively. Although it is desirable to have all of the base-material particles thus interconnected, some of the particles, such as base-material particle 27A, may not be welded to the interconnected mass and therefore may not participate in, or participate only weakly, in the electrochemical reactions.

Figure 4A:
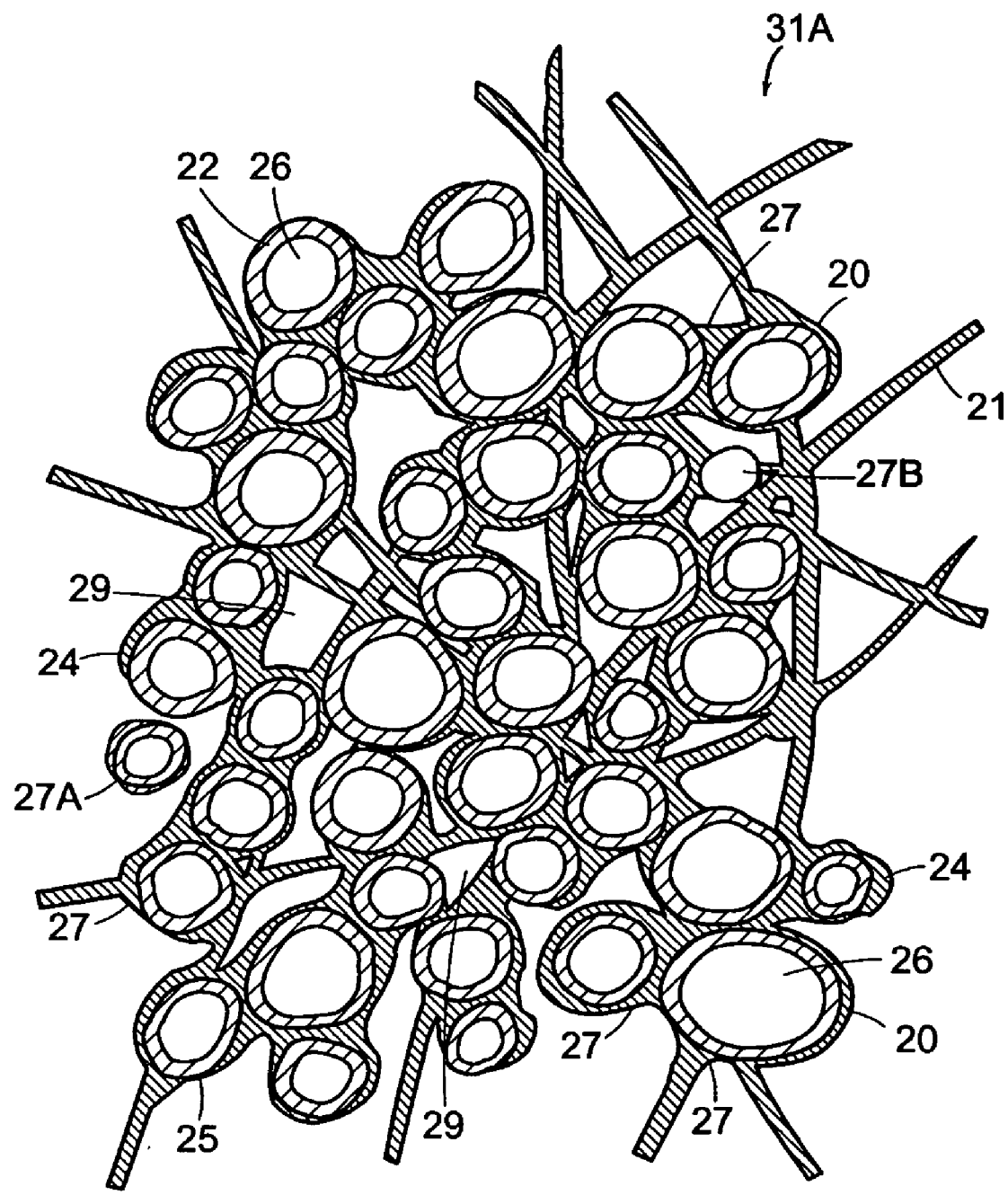
FIG. 4A shows a hollow microsphere electrode with the hollow microspheres sintered together with an electrically interconnecting matrix.

FIG. 4A represents a sectional view of a portion of an electrode 31A comprising a plurality of catalyst coated hollow microbubbles 20 and an interconnecting matrix 21. The interconnecting matrix 21 can form a conductive matrix that includes at least one composite material assembly (e.g., a catalyst coated microbubble 20) in contact with a conductive foam, metal wire mesh, perforated metal foil, metal gauze, metallic foam or felt, a perforated metallic sheet, or some other current collecting grid. For example, metallic nickel foam "INCOFOAM™" available from the Inco Special Products of Wyckoff, N.J., USA, can be used in this application. Material additives to the matrix can include conductive materials such as nickel, copper, carbon, and silver, or alloys, mixtures, or compounds thereof. These various materials in the conductive matrix can be at least partially welded or sintered together. This electrically interconnecting matrix is typically connected to an electrode current contact.

The materials of fabrication for the hollow microspheres 20 are selected based on the type of gas to be charged and discharged, the required charging and discharging rates, the required storage pressure, and the desired electrochemical reactions. Electrode 31A can be either a cathode or anode depending upon the specific electrochemical cell being configured. As shown in FIG. 3 microbubbles 20 include base-material 22 containing hollow regions 26 and coatings 24. As discussed above, the coatings may not cover 100% of the microbubble surface, and uncoated areas 25 may exist on the microbubble. Desirably, in order to ensure a good electrical contact, a large percentage of the microbubbles are welded, sintered, or fused together in a continuously interconnected web that is in electrical contact with the interconnecting matrix. The electrical connections are formed at contact points, e.g., at weld zone 27. In addition to ensuring good electrical contact, the fixed matrix web establishes clear void spaces 29 for contact with the electrolyte. Good electrical and electrolyte contact to all of the particles is necessary for the electrochemical charging and discharging processes to proceed most effectively. Although it is desirable to have all of the base-material particles thus interconnected, some of the particles, such as base-material particle 27A, may not be welded to the interconnected web and therefore may not participate in, or participate only weakly, in these active electrochemical storage techniques.

Also shown in FIG. 4A is solid particle 27B. Because of variabilities in manufacturing techniques, there may be present a small percentage of non-porous solid particles that will not participate in the storage function of this invention to any great extent.

Figure 5:
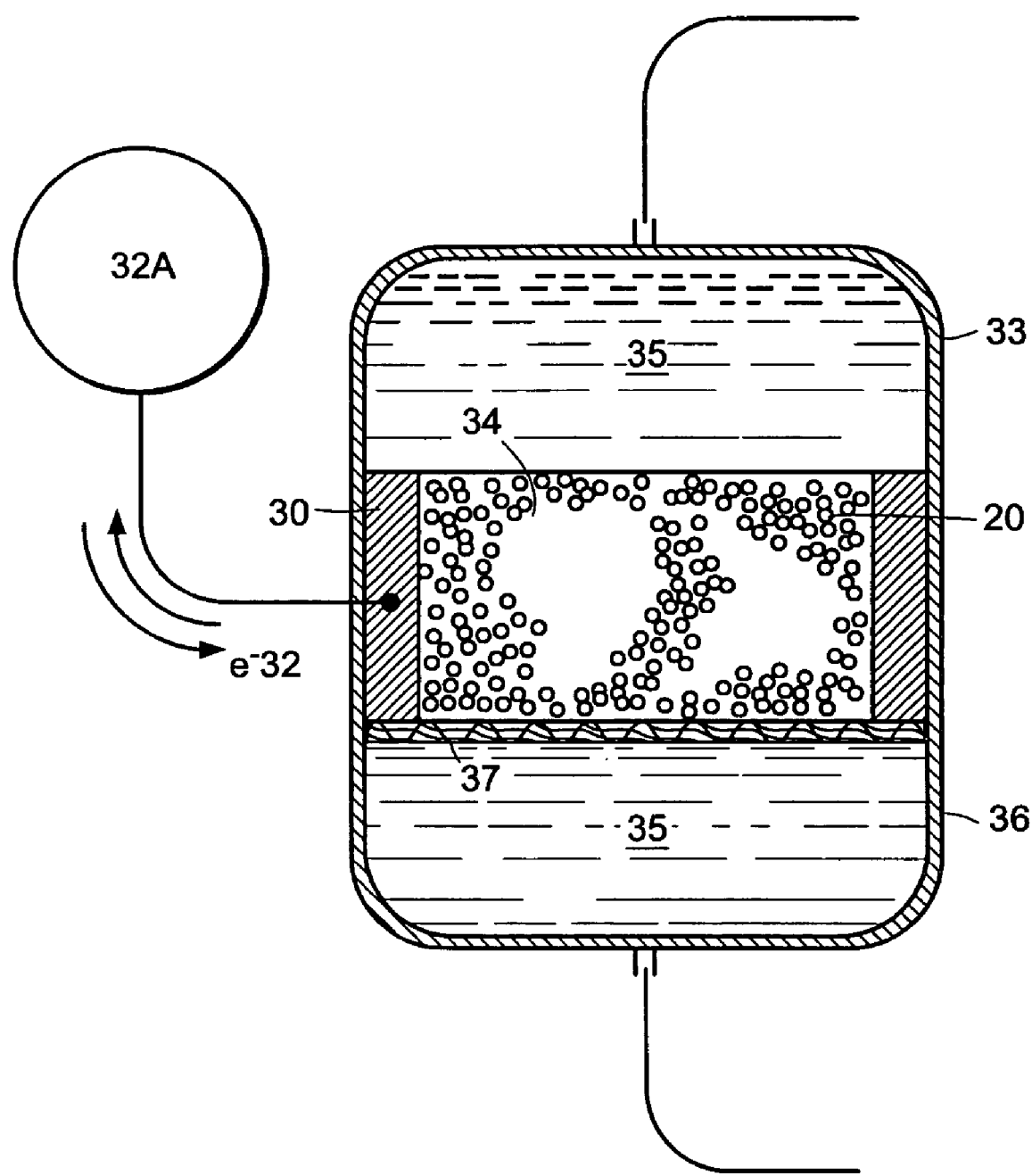
FIG. 5 illustrates an arrangement of the catalyst-coated hollow microspheres in a hydrogen side chamber electrode.

FIG. 5 is a cross-sectional representation of an electrochemical half-cell that can be used for hydrogen storage. As illustrated, it comprises a cylindrical electrode contact 30 disposed about and in electrical contact with a plurality of electrically interconnected catalyst-coated hollow microspheres 20. Many other electrode shapes can also be used. The contact 30 and the microspheres 20 form the hydrogen electrode 34. Microspheres 20 are selected for optimal hydrogen formation, storage, and permeation characteristics. As discussed above, the microsphere base-material 22 can be formed of a borosilicate glass or non-porous alumina-silicate composite. The catalyst coating can be, e.g., a silver-palladium composite, nickel, or a nickel-palladium composite. The silver-palladium composite is known to be particularly effective in electrochemical electrolysis reactions, as described in U.S. Pat. No. 5,318,675. For optimal operation, the microspheres 20 are in physical contact with each other and in electrical contact with the cylindrical contact 30.

In some electrode embodiments, the microspheres are pressed together and/or sintered or welded as shown in FIGS. 4 and 4A. This enhances the direct electrical contact between them. In other electrode embodiments, the microspheres are pressed together with additional additive materials to form an electrolyte permeable, electrically conductive non-sintered matrix electrode. Some of the microspheres 20 are also in direct physical contact with electrode contact 30. Electrical current freely passes between the electrode contact and each of the interconnected microspheres. The current passes between the electrode contact 30 and the metal coating 24 of one microsphere 20, to the metal coating 24 of the next microsphere, and so on. During operation of the device, the surface of each interconnected microsphere is at substantially the same electrical potential.

The hollow microspheres 20 and the electrode contact 30 can be housed within chamber 33, which is at least partially filled with an electrolyte 35. The chamber 33 can function as a part of a housing to contain the electrode. The electrolyte 35 can be an alkaline electrolyte such as potassium hydroxide (KOH). Depending upon the operation temperature of the half-cell, the optimal electrolyte normality will vary. For relativity low temperature operation (−25 C. to 80 C.) an electrolyte concentration of approximately 5N to 6N would be typical. The electrolyte is not meant to be a consumable, but merely assists with and participates in the electrolytic reactions on the microsphere surfaces. Depending upon the application, it can have a solid, liquid, or gel form. Electrolytes based on other alkalis can be used, such as lithium or sodium hydroxide, as well as those based on other alkali metals. Inorganic acids such as sulfuric acid can also be used as an electrolyte. Acidic electrolytes can also have a solid, liquid, or gel form. Organic materials should generally not be used, to avoid fouling, foaming, and unwanted byproducts. When using electrolyte additives, care should be taken to ensure they do not adversely interfere with the electrochemical operation of the microspheres. However, significant operational benefits can be achieved by use of such chemical additions to the electrolyte. For example, electrolyte additives can sometimes be used to control unwanted side-reactions and evolution of gases.

The weight of the hollow microspheres along with any applied compressive force can be supported at the base of the chamber 36, by a support 37. This base supports the microspheres while simultaneously allowing electrolyte 35 to pass through it. The support 37 can be formed, for example, from glass frit or similar porous material. The support can also be formed of any corrosion-resistant material known in the art that is compatible with the chosen electrolyte, such as a porous plastic or other suitable material. Support 37 can be, for example, a hydrophilic polypropylene non-woven felt separator, as used in the battery industry. The entire chamber 33 can be formed of a conductive material, or of a plastic material that is coated or plated with an appropriate corrosion-resistant electrically conductive material. In such embodiments, the entire chamber can function as the electrode 34.

The same chamber 33 and electrode 34 can function as either the positive or negative electrode of an electrochemical cell. The chamber 33, the electrode contact 30, and catalyst-coated hollow microspheres 20 described above can function as the cathodic side of an electrolysis cell during the electrochemical dissociation of water into hydrogen and oxygen, in which the electrode 34 is at a negative electrical potential and electrons 32 flow from the source 32A to the electrode 34. Conversely, the chamber 33, electrode contact 30, and microspheres 20 can be operated as the anode of a fuel cell, in which electrode 34 is at a positive electrical potential and electrons 32 flow from electrode 34 to sink 32A. Hydrogen for this anode-side fuel cell reaction can readily be provided from the hollow region 26 of the hollow microsphere 20. Thus, the chamber 33 and electrode 34, including the metal coating 24 of the microspheres 20 and the electrode contact 30, can function as either the anode or cathode of an electrolytic cell. For clarity, this chamber 33 and electrode 30 will subsequently be referred to as the hydrogen-side of an electrochemical apparatus. The chamber 33 of the hydrogen side thus surrounds the electrode 34 of the hydrogen side. Also for clarity, the power supply will be referred to as a power module. The power module can function as an electron source or sink, depending, e.g., on whether it is supplying DC power to dissociate the electrolyte into its constituents or acting as a load that receives power from a fuel cell (i.e., a reaction operating in the reverse direction). Thus, a power module (e.g., 32A) connected to the electrodes can act as an electron source to the reaction, or as a load (e.g., 32C) receiving work performed by a fuel cell. For example, the power module is in electrical communication with the composite material assemblies such that induced electrochemical reactions cause a gaseous element to either accumulate in or be liberated from the hollow region.

Figure 5A:
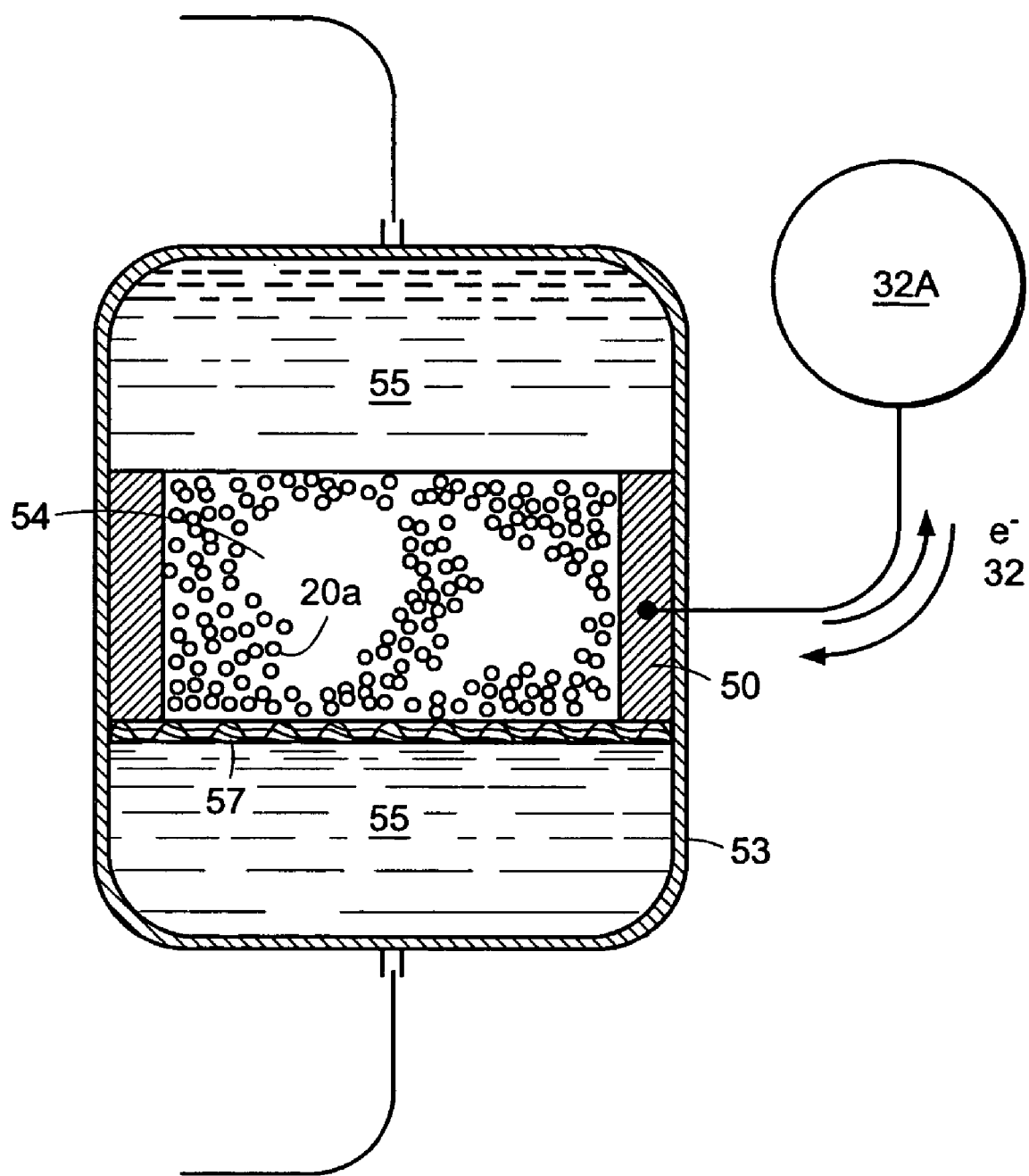
FIG. 5A illustrates an arrangement of the catalyst-coated hollow microspheres in an oxygen side chamber electrode.

The other half of the dissociation/fuel cell reaction can be performed on an electrode of the opposite polarity, which is referred to as the oxygen side of the electrochemical apparatus. The oxygen side mirrors the hydrogen side in many respects, and can be used to perform the corresponding portion of the electrochemical dissociation or fuel cell reaction being performed on the hydrogen side. For example, as shown in FIG. 5A chamber 53 and electrode 54 can function as the anode of an electrolysis cell, forming oxygen, i.e., when the electrode 54 is at a positive electrical potential and electrons 32 flow from the electrode 54 to the sink 32A. The chamber 53 can function as a part of a housing to contain the electrode. Microspheres 20A are selected for oxygen formation, storage, and permeation. As discussed above the microsphere base-material 22A can be comprised of yttria stabilized zirconia or ceria ceramic. The choice of catalyst coating 24A could be silver. Oxygen thus produced can be stored by the previously described permeation processes of this invention in the hollows of microspheres 20A. The same chamber 53 and electrode 54 can also function as the cathode of a fuel cell, providing electrons and converting feedstock oxygen to hydroxyl ions, i.e., when the electrode 54 is at a negative electrical potential and electrons 32 flow from the electron source 34A to the electrode 54. Oxygen for this reaction can be supplied from the hollow regions 26A of microspheres 20A.

Whether oxygen is liberated or consumed, or another element or compound is liberated or consumed, is dependent upon the electrochemical reaction taking place. This, in turn, is dependent upon such factors as the electrolyte being used, the electrical potential at which the device is operated, the operating temperature and pressure of the device, and various other factors apparent to one of ordinary skill in the art. In extreme conditions the operating temperature of the cell can be from −50 to 1000 degrees Celsius, and the operating pressure of the cell, external to the microspheres, can be from 1 Bar to 2000 Bar.

As shown in FIG. 6, the a first electrode within chamber 33 of the hydrogen side can be combined with a second electrode within the chamber 53 of the oxygen side, forming an electrochemical cell 60. Each electrode can include a plurality of composite material assemblies comprising a catalyst-coated base-material and hollow region(s) for storage of their respective gaseous elements. For example, when operating as a power consuming electrolyser current 32 is driven from the oxygen electrode contact 50 to the hydrogen electrode contact 30 by power source 32B (the power module). This mode of operation produces hydrogen and oxygen that are stored internally for later use with the respective microspheres. When operating as a power producing fuel cell current 32 is driven from hydrogen electrode contact 30 to the oxygen electrode contact 50 through the applied load 32C (the power module) by the electromotive force generated by the cell. In this mode of operation power is being delivered to the load. Operating reversibly between these two modes (an electrolyser and a fuel cell), the device can function as an effective secondary (rechargeable) battery having significant electrical power storage capacity.

An electrolyte recirculation pump 62 maintains a flow of electrolyte that continuously provides fresh reaction materials to the surfaces of the metal-coated microspheres, using electrolyte flow channels 64A and 64B as shown. In different embodiments, the electrolyte is recirculated in different directions. The desired recirculation flow rate and pressure can be established and controlled by using recirculation pump 62. The recirculation flow minimizes the accumulation of reaction products at the surfaces of the microspheres 20 and 20A, minimizes adverse polarization of the microsphere surfaces, and enhances the efficiency of the electrochemical cell 60. In an embodiment of the invention, the hydrogen-oxygen cell can be hermetically sealed from the outside environment, since the cell reactions are completely reversible and all reactants are contained within the cell. An additional benefit of hermetically sealing is to suppress any tendency to generate gaseous hydrogen and/or oxygen during the charging process by allowing the internal cell pressure to increase, thereby suppressing gaseous generation. In some embodiments, the electrolyte is non-pumped or static, relying on electrolyte diffusion and migration to move products and reactants. This eliminates the need for pump 62 and simplifies the design. Thermosiphoning techniques can also be used. Also note that electrode shapes and configurations of all types can be used in cell construction. The cell can also include temperature control units 71.

Figure 7:
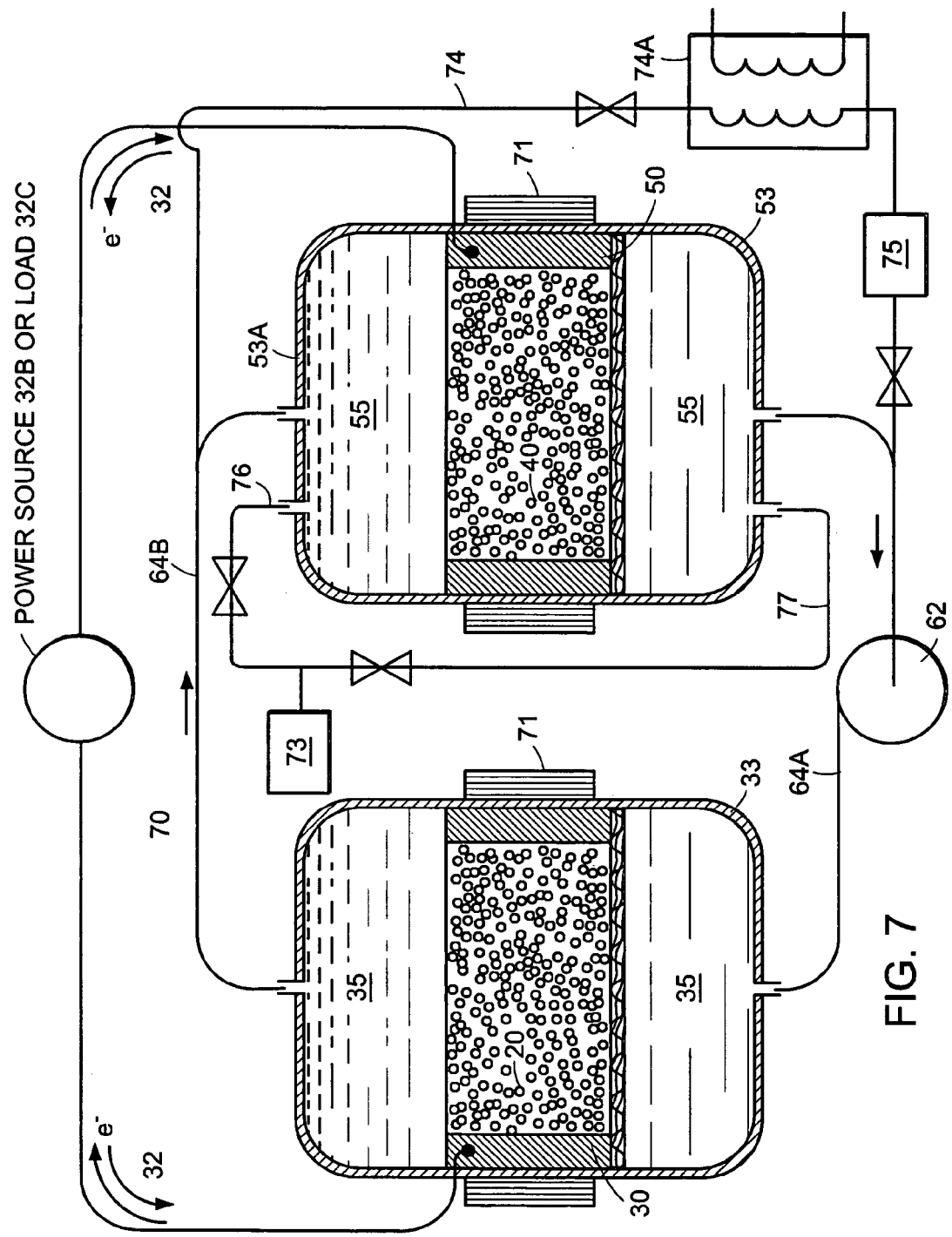
FIG. 7 illustrates another embodiment of an electrolytic cell that includes hollow and solid catalyst-coated microspheres, comprising additional features.

FIG. 7 is a schematic of another embodiment of an electrochemical cell 70. In this embodiment, microspheres 20A are replaced with a solid type microsphere 40 shown in FIG. 3C. The cell includes temperature control units 71, gaseous oxygen connection 73, and a water connection 75. Operating temperatures for cell 70 are typically in a range of 50 C. to 250 C.

This embodiment can be operated in a mode to electrolyze water. In this operating mode, the electrochemical cell 70 produces both hydrogen and oxygen. Oxygen is produced on the catalyzed surface 42 of the solid microspheres 40, rises to the top surface 53A of the oxygen-side chamber 53, and flows to the oxygen connection 73 via upper flow path 76. The oxygen can then be vented or accumulated in an outside reservoir for subsequent use. Driving electrons 32 from the oxygen side electrode contact 50 to the hydrogen side electrode contact 30 by the applied power source 32B does this. As the device is operated to electrolyze water, water is consumed. Since water make-up to the electrolyte solution is required, changes in water content affect the pH of the electrolyte and the performance of the cell. It is important to properly control the amount of water used to replenish the electrolyte. Water makeup, to replace the consumed water, may be provided by the water connection 75. Additional water may be added as required to maintain proper fluid levels within the electrochemical cell 70. The amount of water addition required can be determined by monitoring the pH level of the electrolyte.

The electrochemical cell 70 can also be operated in the reverse direction, as a fuel cell. Electrons are driven from the hydrogen side electrode contact 30 to the oxygen side electrode contact 50, through the applied load 32C by the electromotive force of the cell reactions. Since water is produced by the fuel cell reaction, excess water accumulation is periodically drained from the system via the water connection 75. This is typically done by venting vapor from connection 74 through a heat exchanger 74A, in which the vapor is condensed. In this operating mode, oxygen is consumed by the electrochemical reaction and can be provided to the oxygen-side chamber 53 from the oxygen connection 73, via lower flow path 77. This oxygen feedstock can be supplied from a virgin oxygen source. In some embodiments, the oxygen feedstock comprises oxygen that is recycled from an earlier dissociation cycle of the electrochemical cell 70, in which it was operated as an electrolyser. This alternative oxygen feed source can be used to supplement or replace the virgin oxygen feedstock. Temperature control units 71 are used to heat and cool the electrochemical cell, for purposes described below.

Reversible electrochemical reactions such as water electrolysis and fuel cell reactions can be performed in electrochemical cell 70. These reactions can occur at the catalyst coating 24 of the hollow microspheres 20 and the catalyst coating 42 of the solid microspheres 40. FIG. 8 presents a diagram illustrating how water dissociation occurs at these surfaces, and includes corresponding electrochemical dissociation equations. The graphic of FIG. 8 also includes diagrammatic representations of the ionic transformations and transfers that can occur at each electrode during electrochemical reactions. The cathode illustrated in the figure includes catalyst coating 24 of the hollow microspheres 20. As indicated above, the surfaces of these microspheres are in physical contact with each other and in direct electrical contact with electrode contact 30 (see FIG. 7). The anode illustrated in FIG. 8 includes catalyst coating 42 of the solid microspheres 40, which are in physical contact with each other and direct electrical contact with electrode contact 50. In embodiments where the gaseous accumulation and storage function of the present invention are to be used on the oxygen side of electrochemical cells, solid microspheres 40 would be replaced with hollow catalyst-coated microspheres 20A. These microspheres would have a corresponding base-material 22A, a catalyst coating 24A and a hollow region 26A. The modification of ionic transformations and transfers for this embodiment are shown in the figure as an option inset.

As illustrated, dissociation of water (HOH) occurs at the cathode resulting in the production of hydroxyl ions (OH—) and hydrogen (H) (Equation A). Electrons (e−) for the reaction are provided from the hydrogen-side electrode contact 30 through the metal coating 24 of the hollow microspheres 20, to the metal coating of the hollow microsphere illustrated in FIG. 8 (see FIG. 7). The palladium/silver (Pd/Ag) metal coating 24 catalyzes the reaction, promoting the localized generation of hydrogen, and increasing the presence and concentration of hydrogen at the surface of the catalyst coating 24. The catalyst coating 24 and the spherical substrate 22 are both permeable to hydrogen, as described above. The proximity and high concentration of the forming hydrogen results in migration of the hydrogen through the catalyst coating 24 and the spherical substrate 22, and into the hollow region 26 of the microsphere. Thus, the electrochemical reaction provides a high concentration of hydrogen immediately outside the hollow microsphere 20, which then migrates through the metal coating 24 and spherical substrate 22 into the hollow region 26. Large quantities and high concentrations of hydrogen within the hollow region 26 are thus achieved. The result of this reaction is that significant amounts of hydrogen can be accumulated and stored within the hollow regions 26 of the hollow microspheres 20, at high pressure.

Charging of the hollow regions 26 of the microspheres using these electrochemical techniques allows high concentrations of hydrogen to be stored in the hollow regions 26. The effect is so pronounced, that extended charging can actually result in over-pressuring and rupturing of the microspheres 20. This occurs when a charging cycle is operated until high pressure hydrogen is stored within the hollow region 26. Upon removal or reduction of the charge to electrode 30, the hydrogen pressure within the hollow region can exceed the localized osmotic or concentration pressure of the hydrogen without. Under these conditions the microspheres can rupture, if the hollow region has been overcharged with hydrogen. This can happen because the large internal pressure of the hydrogen is now contained only by the physical structural strength of the microsphere, plus any hydraulic pressure exerted by the electrolyte 35 external to the microsphere, and no longer by the inward electrochemical hydrogen migration forces produced by electrochemical Reaction A.

When determining the type and sequence of microsphere substrate layers to be used for a given microsphere application, appropriate layers should be selected to ensure the microspheres 20 will have sufficient structural integrity to contain the hydrogen storage pressures to be accommodated. Storage pressures of over 10,000 psi are achievable within the hollow regions 26, without the use of high-pressure containment equipment. These benefits can be achieved by creating high pressures only within the hollow regions 26, and not within the interior of the chamber 33. High energy storage densities, are thus achievable while only using vessels and equipment that are not required to withstand high pressure. Hydrogen storage densities on the order of liquid hydrogen are achievable within the hollow regions 26 of the microspheres.

Different techniques can be used to control the accumulation and storage of hydrogen in the hollow regions 26. Temperature and pressure within the chamber 33 can be controlled to optimize the generation and migration of hydrogen. For example, temperature significantly affects the permeability, and hence the resulting migration rates, of hydrogen molecules through the spherical substrate 22 of the hollow microsphere 20. Temperature can be controlled using temperature control units 71 (see FIG. 7) that can heat and cool the contents of the chambers. In some embodiments, allowing the electrolyte to be somewhat pressurized during charging will reduce the tendency to generate hydrogen gas off the catalytic surfaces of the microspheres. For example, a pressurizeable environment can be created within the housing and the pressure of the gaseous element adjusted, such that the accumulation or liberation of the gaseous element from the hollow region is controlled. The reaction and storage kinetics can also be controlled using other parameters, such as electrical potential and current flow. These control parameters can also be used to control the rate, the amount, and the storage conditions of the hydrogen within the hollow microspheres 20.

As illustrated in the anode equation of FIG. 8 (Equation B), the positive potential at the anode attracts the hydroxyl ions (OH—) formed at the cathode. Electrons (e–) are removed from the hydroxyl ions, and water (HOH) and oxygen (O) are formed, as illustrated in the diagram. The coating 42 catalyzes this reaction. The water returns to the electrolyte solution 55, whereupon the recirculation pump 62 makes these molecules available to the hollow microspheres 20 disposed at the hydrogen side of the electrochemical cell 70 via electrolyte flow channel 64A. The oxygen atoms formed at the anode combine with each other to form $O_2$. These molecules bubble to the surface 53A of chamber 53 where they can be collected or vented. When hollow microspheres 20A are used on the oxygen side as shown in FIG. 6, oxygen (O) formed at the catalytic surfaces 24A of microspheres 20A accumulate therein and subsequently migrate through the catalyst layer 24A and the substrate 22A to the hollow regions 26A for storage. This process is analogous to the process on the hydrogen side as discussed above.

The overall reaction taking place in electrochemical cell 70 results in the formation of hydrogen and oxygen from water, as illustrated by Equation C of FIG. 8. Since water is consumed by the reaction, additional water makeup is provided to maintain the proper fluid levels in the electrochemical cell 70. This water can be provided using water connection 75 as discussed above. As illustrated in FIG. 8 the electrolytes 35 and 55 combine and mix in the operation of the embodiment. Also as illustrated, this combined electrolyte plays an integral role in both of the independent half-cell reactions (Equations A and B).

Figure 9:
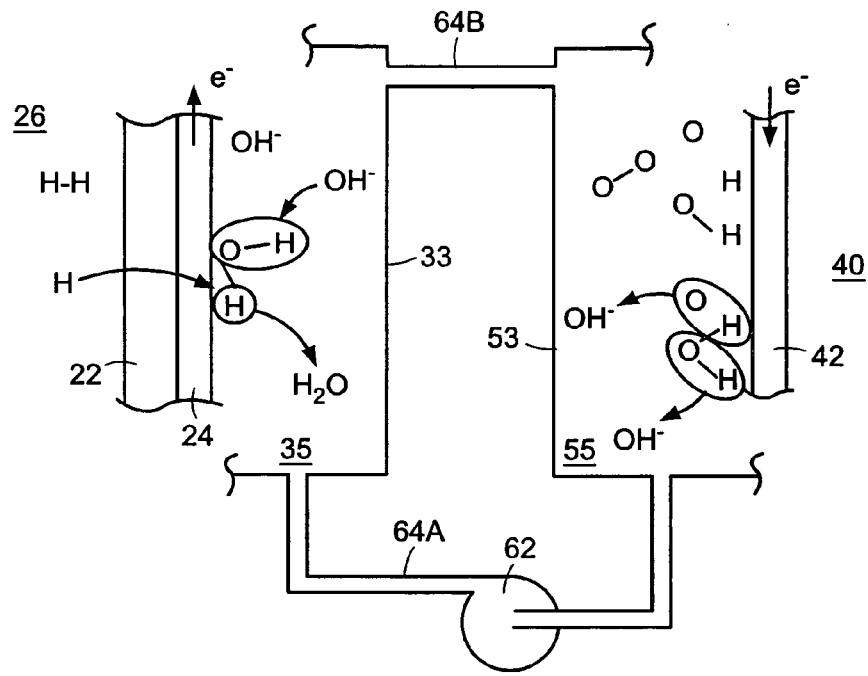
FIG. 9 illustrates an electrochemical process comprising a fuel cell.
Figure 9A:
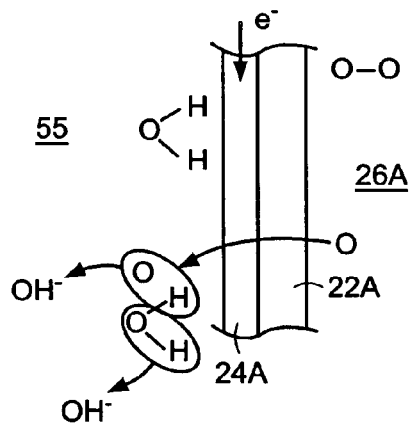

FIG. 9 illustrates how the microspheres 20, 40 of electrochemical cell 70 can be used for a fuel cell reaction. In embodiments where the gaseous accumulation and storage function of the present invention are to be used on the oxygen side of electrochemical cells solid microspheres 40 would be replaced with hollow catalyst-coated microspheres 20A. These microspheres can have a corresponding base-material 22A, a catalyst coating 24A, and a hollow region 26A. The modification of ionic transformations and transfers for this embodiment are shown in the figure as an inset. The diagram illustrates the ionic transformations and mobilities that can occur at the metal surfaces 24, 42 of the microspheres 20, 40, and includes the corresponding electrochemical fuel cell equations. The electrodes represented in the figure comprise the catalyst coating 24 of the hollow microspheres 20 as part of the anode, and the catalyst coating 42 of the solid microspheres 40 as a part of the cathode.

Oxygen (O) is introduced to the apparatus, for example, using the lower oxygen flow path 77 (FIG. 7). The oxygen rises and approaches the metal catalyst 42 of the solid microspheres 40. The oxygen combines with electrons (e–) provided by the catalyst coating 42 and with water molecules (HOH) of the electrolyte 55, and produces hydroxyl ions (OH—) (Equation D). Electrons (e–) for the reaction are provided from the oxygen-side electrode contact 50 through the catalyst coating 42 of the microspheres 40, to the catalyst coating 42 of the hollow microsphere 40 illustrated in FIG. 9 (see FIG. 7), to supply the reaction. The catalyst coating 42 of the microspheres 40 is at substantially the same electrical potential as the electrode contact 50, promoting the uniform consumption of oxygen across all of the microspheres 40. The catalyst coating 42 catalyzes the reaction, promoting the consumption of oxygen. The hydroxyl ions formed become a part of the electrolyte 55 solution.

When hollow microspheres 20A are used on the oxygen side, as shown in FIG. 6, oxygen (O) is supplied from the hollow regions 26A by migration and diffusion through substrate 22A and catalyst layer 24A. This oxygen being stored in the hollow region 26A before commencement of the fuel cell reaction, using techniques described above. The bulk of the oxygen stored is in the form of diatomic oxygen gas stored at high pressures in the interior hollow regions 26A of microspheres 20A. In the absence of reaction catalysts on the interior of the hollow walls, oxygen species migrate and diffuse through and out of the microspheres in diatomic form. Increasing the temperature of the hollow microspheres can enhance the rate of oxygen gas migration or permeation. When there is a reactive catalyst present on the interior surface of the hollow region 26A microspheres 20A, as shown and described in FIG. 3B, oxygen may permeate as oxygen atoms. These different processes are temperature dependent. The oxygen combines with electrons (e–) provided by the catalyst coating 24A and with water molecules (HOH) of the electrolyte 55, and produces hydroxyl ions (OH—) (Equation D).

The positive potential at the anode attracts the hydroxyl ions (OH—) that have been formed at the cathode. Electrons (e–) are removed from the hydroxyl ions, and they combine with hydrogen provided from the hollow region 26 of the hollow microspheres 20 to form water (HOH). This reaction proceeds according to the anode equation (Equation E) of FIG. 9. The water returns to the electrolyte solution 35 and the recirculation pump 62 makes the water molecules available to the cathode via electrolyte flow channel 64B.

Hydrogen required to supply the anode reaction of the fuel cell (Equation E) can be provided from the hollow region 26 of the hollow microspheres 20. This hydrogen is stored in the hollow region 26 before commencement of the fuel cell reaction, using techniques described above. The bulk of the hydrogen stored is in the form of diatomic hydrogen gas stored at high pressures on the interior of the glass spheres. In the absence of reaction catalysts on the interior of the hollow walls, hydrogen species migrate through and out of the microspheres in diatomic form. This hydrogen gas migration or permeation rate can be enhanced by increasing the temperature of the hollow microspheres. When there is a reactive catalyst present on the interior surface of the hollow microspheres, as shown and described in FIG. 3B, permeation of hydrogen may proceed as hydrogen atoms. These different processes are temperature dependent. Since the catalyst coating 24 and the spherical substrate 22 of hollow microsphere 20 are both permeable to hydrogen, the stored hydrogen is readily provided to the catalyst coating 24 of the hollow microsphere 20 from the hollow region 26 to fuel the anode reaction. The proximity and high concentration of the consumable hydrogen results in rapid and efficient progression of the fuel cell reaction.

The rate of the fuel cell reaction can be controlled using a number of control parameters. Since large amounts of hydrogen are available from the hollow microspheres 20, controlled release of the hydrogen may be desired. Temperature is an effective control parameter for this purpose. Temperature control units 71 can be effectively used to manipulate the temperature of the hollow microspheres 20, affecting their permeability. Increasing the temperature of the microspheres increases their permeability, accelerates the rate of hydrogen liberation, and thus accelerates the fuel cell reaction. Cooling the temperature of the hollow microspheres 20 slows the fuel cell reaction. Other hydrogen liberation techniques are available, and are described below. The fuel cell reaction kinetics can also be controlled using other techniques, known to those of skill in the art. The same temperature control techniques can be effectively used to control the permeation rates of oxygen, when using microspheres 20A for oxygen storage.

Still referring to FIG. 9, the overall reaction taking place in electrochemical cell 70, when operating as a fuel cell, results in the formation of water from hydrogen and oxygen (Equation F of FIG. 9). Excess water that is formed can be removed from the electrolytic cell 70 using water connection 75. The removed water can be saved for later use with the electrochemical cell 70, or it can be discarded.

It will be apparent to one of ordinary skill in the art that different embodiments described above can be combined. For example, electricity can be provided to the electrochemical cell 70 to dissociate water into hydrogen and oxygen (Equation C). After generating these gaseous products, the electrochemical reaction can be reversed and the hydrogen previously generated can be used as a feedstock to supply a fuel cell, thereby using the same electrochemical cell 70 to generate electric power via Equation F. The electric power can be used to do work or it can be converted to other forms of energy, such as mechanical energy, if desired.

Figure 10:
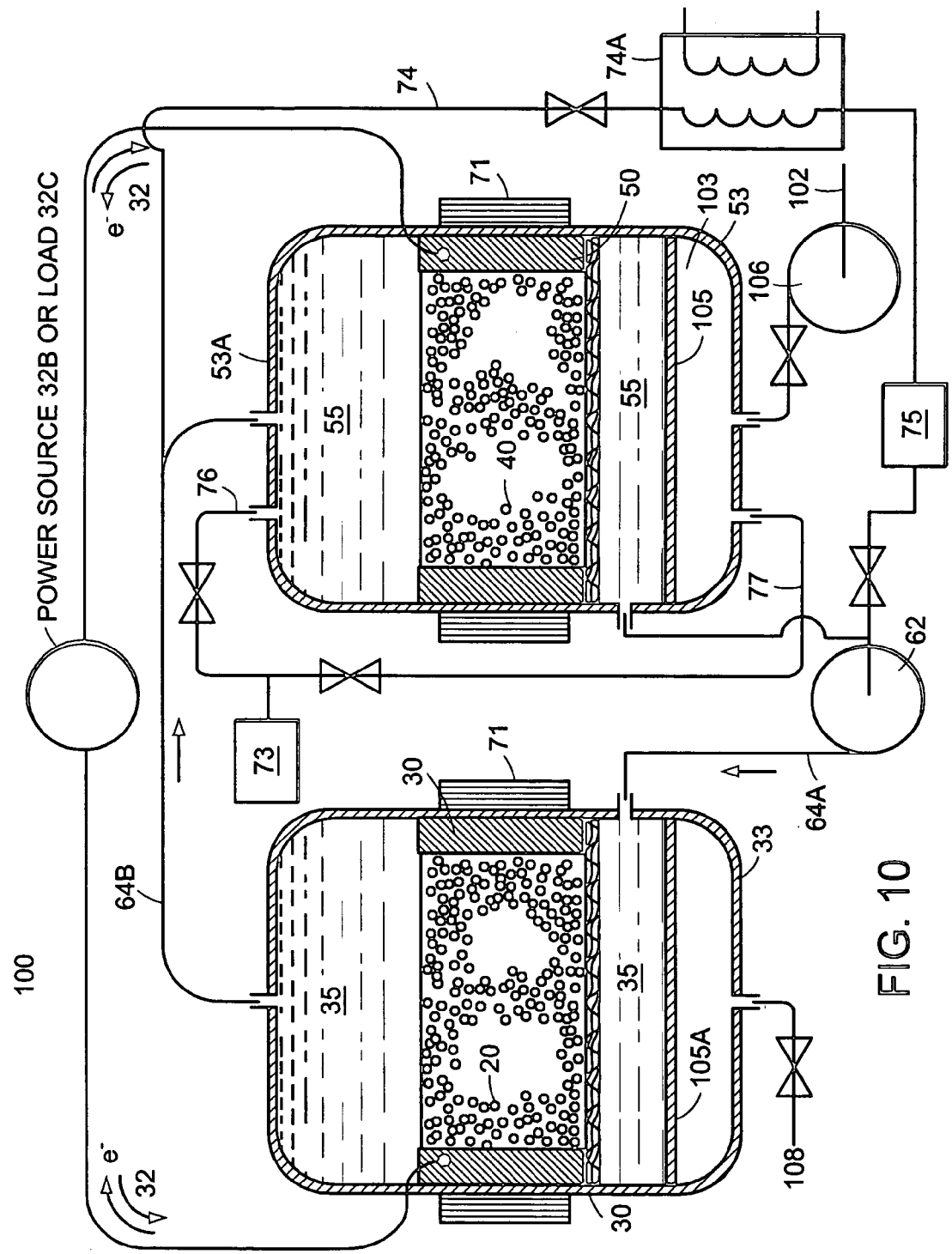
FIG. 10 shows an embodiment including the addition of air to the electrochemical process.

Referring to FIG. 10, another fuel cell embodiment uses air as an oxidizer instead of, or in addition to oxygen supplied from the oxygen connection 77. As shown, the electrochemical cell 100 can include an air supply 102, an air supply chamber 103, and a gas dispersion membrane 105. The air supply can include an air pump 106. This electrochemical cell 100 can be operated in ways described with regard to the electrochemical cell 70 of FIG. 7. However, additional operational features are included. When an oxidizer such as oxygen is required to operate the electrochemical cell as a fuel cell, oxygen from an air supply 102 (e.g., ambient air) can be used. Ambient air can be used in place of oxygen from the oxygen connection 77 or can be used as an oxygen supplement. If the electrolyte used in the electrochemical cell is alkaline, air from the ambient air source may need pretreatment, such as carbon dioxide scrubbing.

The gas dispersion membrane 105 allows upward flow of the air into the chamber 53 and provides for air distribution. In one embodiment, gas dispersion membrane 105 is a glass frit. Use of a glass frit for this purpose can require that continuous air flow be provided to prevent downward migration of the electrolyte 55 into the air chamber 103. The impact of this constraint is reduced if the air dispersion membrane 105 comprises an actual membrane.

In still other embodiments, hydrogen can be added to chamber 33 from an external source, such as hydrogen supply connection 108. This hydrogen source can either supplement or replace the function of hollow microspheres 20 as a source of hydrogen for the fuel cell. This can be useful, for example, if the hydrogen stored in the hollow microspheres becomes depleted. However, in this embodiment, the hydrogen reaction can still be catalyzed using catalyst coating 24 of the hollow microspheres 20. When hydrogen is provided using hydrogen connection 108, a gas dispersion membrane 105A can be used to distribute this flow.

Hydrogen provided by the hollow microsphere technology of the present invention can be used, for example, as a feedstock to a fuel cell, secondary battery, or as fuel for a combustion engine such as an automobile, aircraft, or rocket engine. Hydrogen for these purposes can be liberated from the hollow regions 26 of the hollow microspheres 20 using a number of techniques. One method discussed above for manipulating the migration rate of hydrogen into and out of the hollow region 26 of the hollow microspheres is to control the temperature of the microspheres. To liberate hydrogen, the temperature can be increased, for example, using temperature control units 71. Cooling the microspheres slows down the hydrogen release rate.

Figure 11:
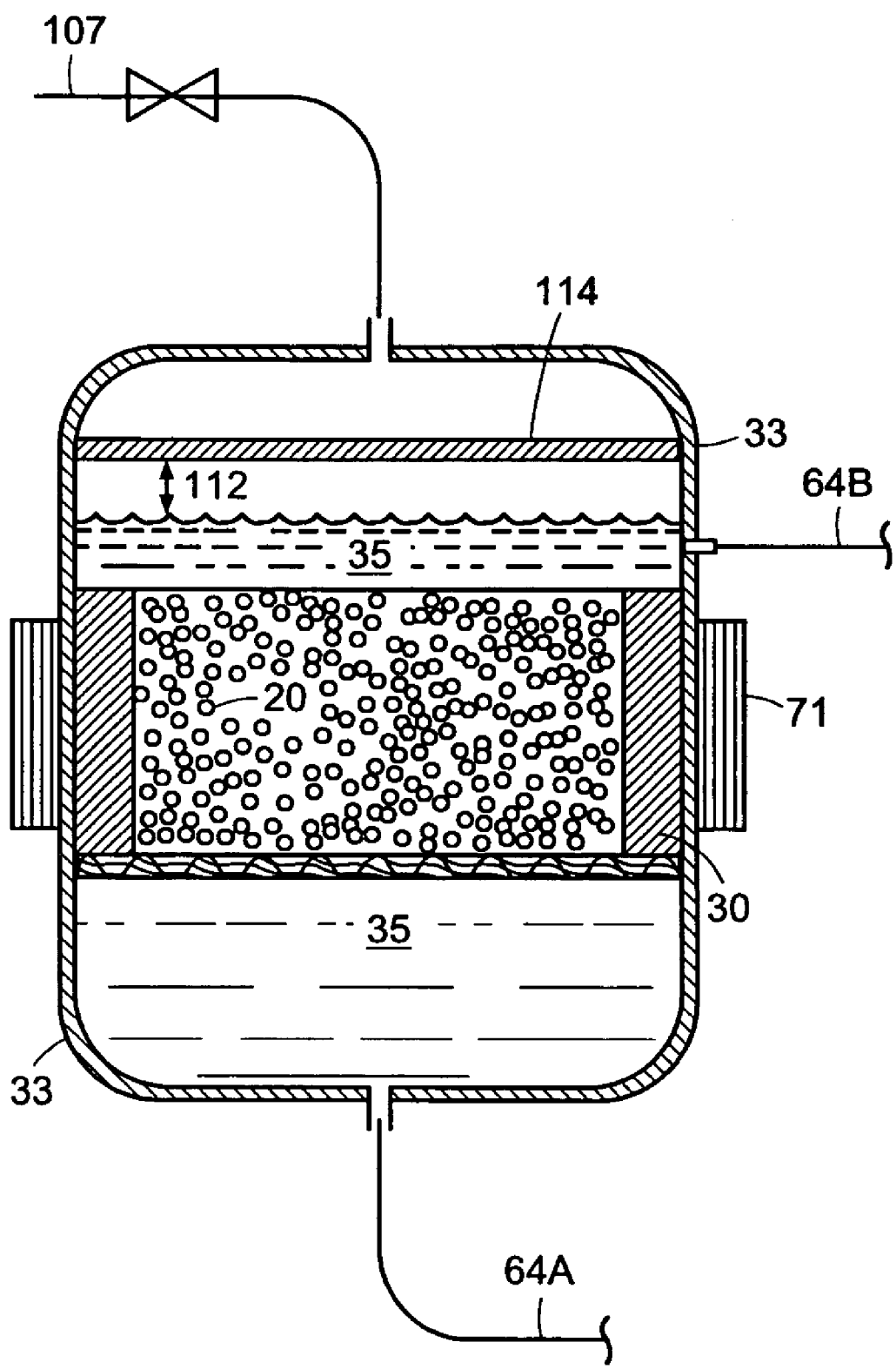
FIG. 11 illustrates a method and apparatus that can be used to manage liquid entrainment.

FIG. 11 shows a way to manage liquid entrainment when gas is being liberated from the hollow regions 26 of the microspheres. Liberated gas from microspheres 20 flows out through gas supply connection 107. High gas velocities resulting from rapid rates of hydrogen liberation from the hollow microspheres 20 within chamber 33 can result in the entrainment of small droplets of liquid electrolyte 35. Unwanted liquid electrolyte entrainment can be eliminated, for example, by providing adequate disengagement space 112 at the top of chamber 33. Referring to the figure, a demister or separation membrane 114 can also be used to eliminate such entrainment. The demister or separation membrane 114 can be located at the top of chamber 33 with (or without) a disengagement space 112.

Another method of liberating hydrogen stored in the hollow microspheres 20 is to physically rupture the microspheres. Although effective, this prevents reuse of the hollow microspheres for subsequent hydrogen storage operations.

Figure 12:
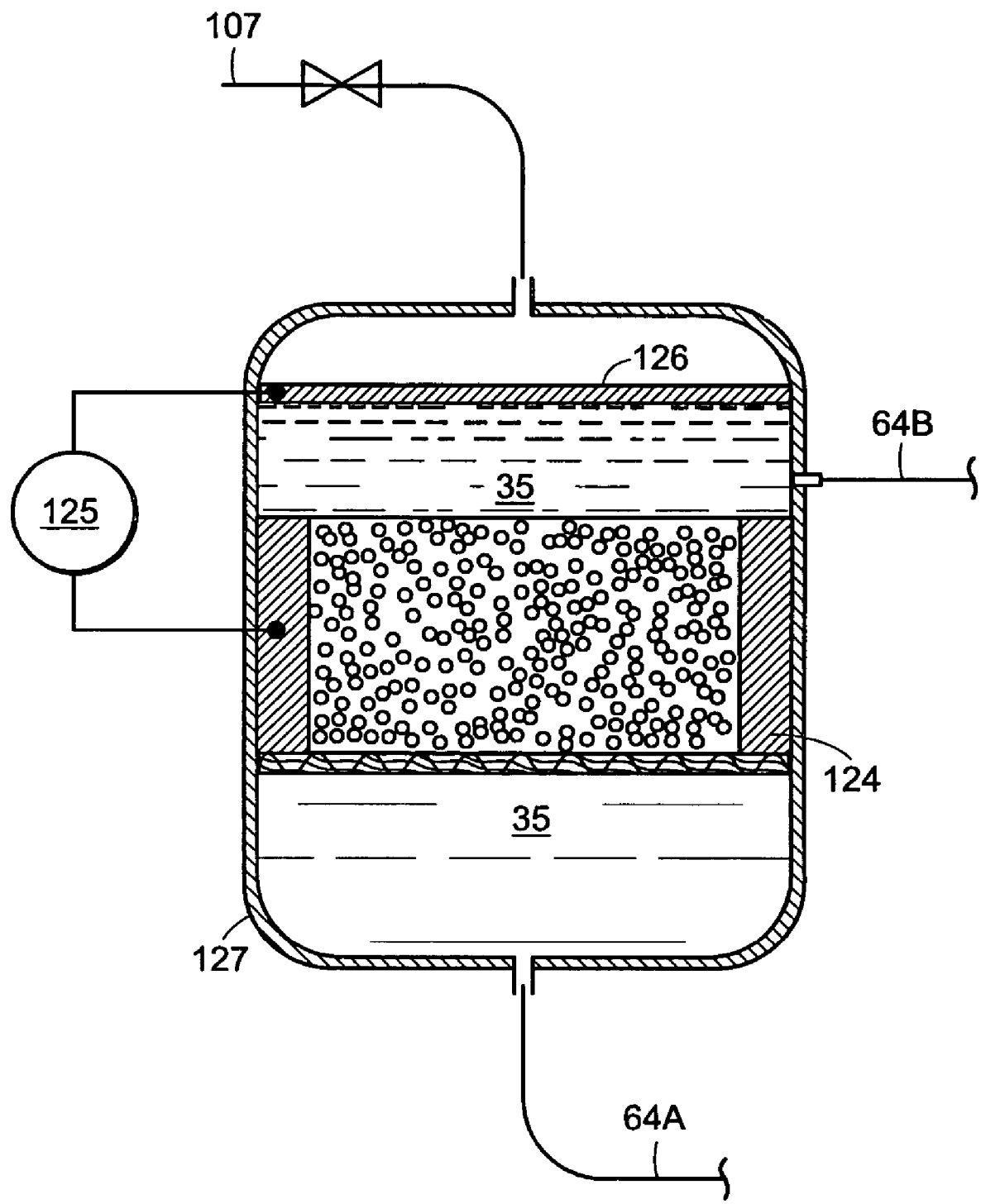
FIG. 12 shows an apparatus that can be used to accelerate the liberation of stored hydrogen from hollow microspheres.

FIG. 12 shows another method for liberating stored hydrogen from the hollow microspheres 20. In this embodiment, electrical potential is applied by power supply 125 to liberation electrode 124 in direct electrical contact with the catalyst coating 24 of the hollow microspheres 20. Application of a negative potential to liberation electrode 124 in conjunction with electrode 126 (which is immersed in the electrolyte) causes the catalyst coating 24 to become cathodic, drawing the hydrogen from the hollow region 26 and through the spherical substrate 22 and catalyst coating 24. Application of this negative potential to the liberation electrode accelerates the liberation rate of hydrogen gas from the microspheres 20. Increasing the current flow and applied voltage to liberation electrode 124 tends to increase the liberation rate of the stored hydrogen. Conversely, reversing the polarity of liberation electrode 124 causes hydrogen to be retained within the hollow regions 26 of the microspheres, inhibiting the outward migration of hydrogen from the hollow regions 26. Applying a positive charge to liberation electrode 124 slows the hydrogen evolution reaction at the catalyst surface, thus inhibiting migration of hydrogen through the microsphere. This is a useful hydrogen storage enhancement technique, extending the time hydrogen can be effectively stored within the microspheres. In these embodiments, the electrode 126 can include a hydrogen-permeable conductive membrane as the counter electrode at the top of the chamber 127. This conductive hydrogen-permeable membrane can be used in combination with the liberation electrode to complete the electrical circuit.

To electrochemically release hydrogen from the microspheres 20, a current is forced to flow from the plated microballoon 20 to membrane 126, for example, according to the following reactions.

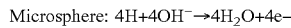

Microsphere: $4H + 4OH^- \rightarrow 4H_2O + 4e-$

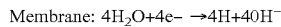

Membrane: $4H_2O + 4e- \rightarrow 4H + 4OH^-$

Thus, H is electrochemically transferred from the microsphere 20 via the electrolyte 35 to the membrane 126. Once it reaches the membrane, the hydrogen H diffuses through and becomes available on the gas side (the upper surface, as illustrated) as $H_2$ (diatomic hydrogen gas). Liberated $H_2$ gas is supplied from the storage chamber 127 via gas supply connection 107. The membrane 126 can be made of a commercially available thin sheet (0.001 to 0.05 inches thick) of silver-palladium alloy (25% Ag/75% Pd).

Within the physical constraints of the gas diffusion and permeation limitations of the microspheres, these embodiments can provide for the more rapid liberation of stored hydrogen from the hollow microspheres 20. These techniques can be useful, for example, if it becomes necessary to make more hydrogen available as an energy supply to a fuel cell, such as when the operator of a fuel-cell-powered vehicle wishes to accelerate the vehicle. Reversing the polarity of this liberation electrode has the opposite effect, allowing the hydrogen to be stored for a longer period of time.

Figure 13:
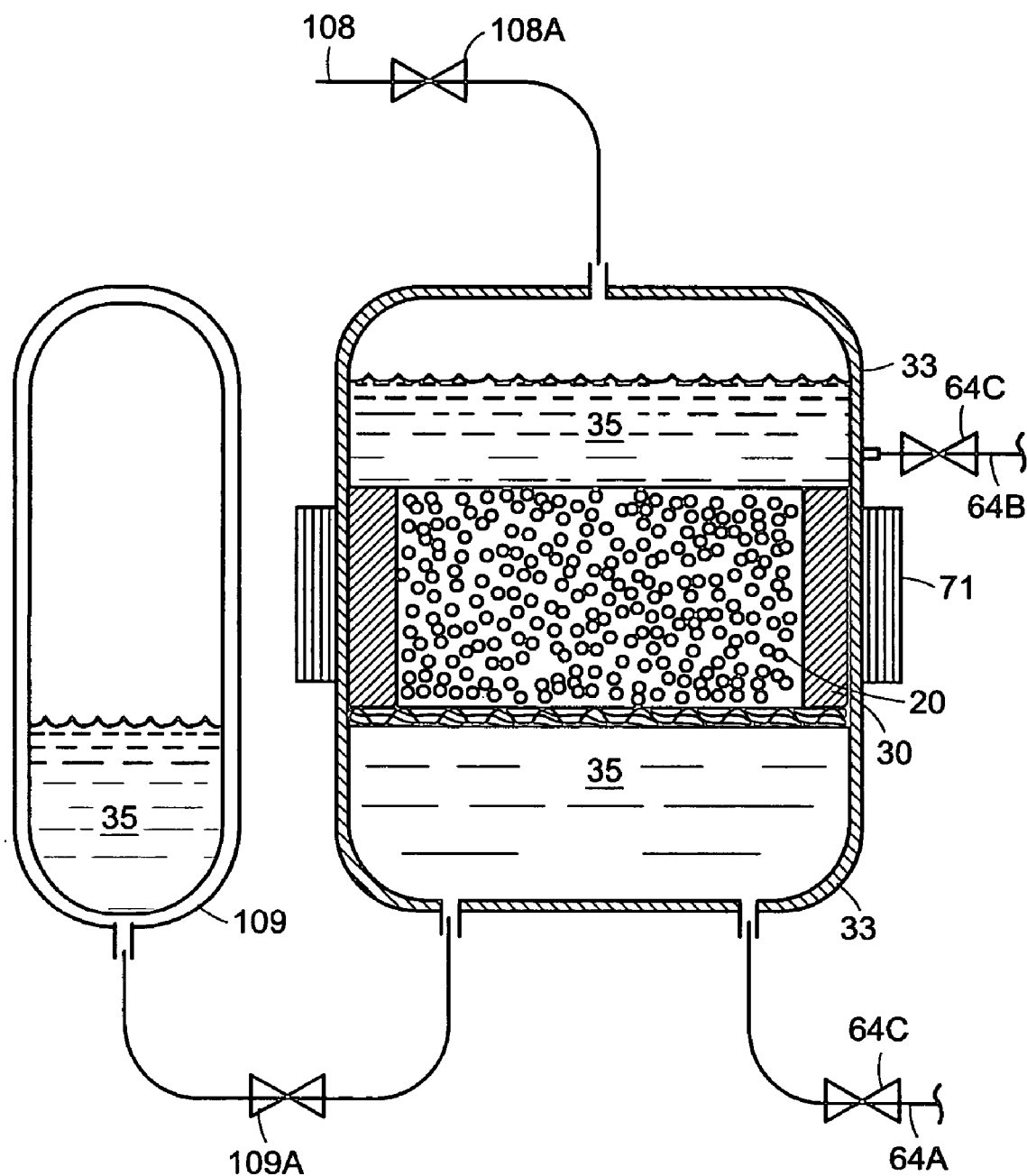
FIG. 13 shows an embodiment including a hydrogen-side chamber including gas pressurization and an electrolyte accumulator.

FIG. 13 shows an embodiment comprising hollow microspheres 20 and electrode contact 30 disposed in a hydrogen-side chamber 33. In this embodiment chamber 33 is a pressure vessel capable of supporting very high pressures. Hydrogen gas is charged into microspheres 20 by application of high pressure gas from out side supply 108. During the charging cycle the electrolyte flow valves 64C are closed and accumulator valve 109A and gas supply valve 108A are opened. Electrolyte 35 is forced from chamber 33 into accumulator chamber 109 by the applied pressure difference between the chambers. The gas charging pressure can be very high and should be higher than the desired gas storage pressure. At certain temperatures the high pressure gas can be forced to diffuse through the catalyst layer 24 and the substrate walls 22 of the microspheres 20. During charging the temperature of the chamber may be increased by heater 71. When the charging cycle is complete the high pressure within the chamber is released through gas supply 108. This allows the electrolyte 35 to flow back into chamber 33. Subsequently valves 109A and 108A are closed and valves 64C opened. This method of charging the microspheres 20 with gas can be used instead of or to supplement the electrolytic charging method.

Referring back to FIG. 12, stored hydrogen can be liberated from the hollow microspheres 20 using a single chamber. Furthermore, although electrochemical cells comprising two chambers (hydrogen-side chamber 33 and oxygen-side chamber 53) have been illustrated (e.g., FIGS. 6, 7, and 10) the invention comprises embodiments in which, for example, hollow microspheres 20 and solid microspheres 40 are disposed within a common chamber, and can share common electrolyte without requiring the use of electrolyte flow channels 64. This is also true for embodiments in which, for example, hollow microspheres 20 and 20A are disposed within a common chamber, and can share common electrolyte again without requiring the use of electrolyte flow channels 64.

Figure 14:
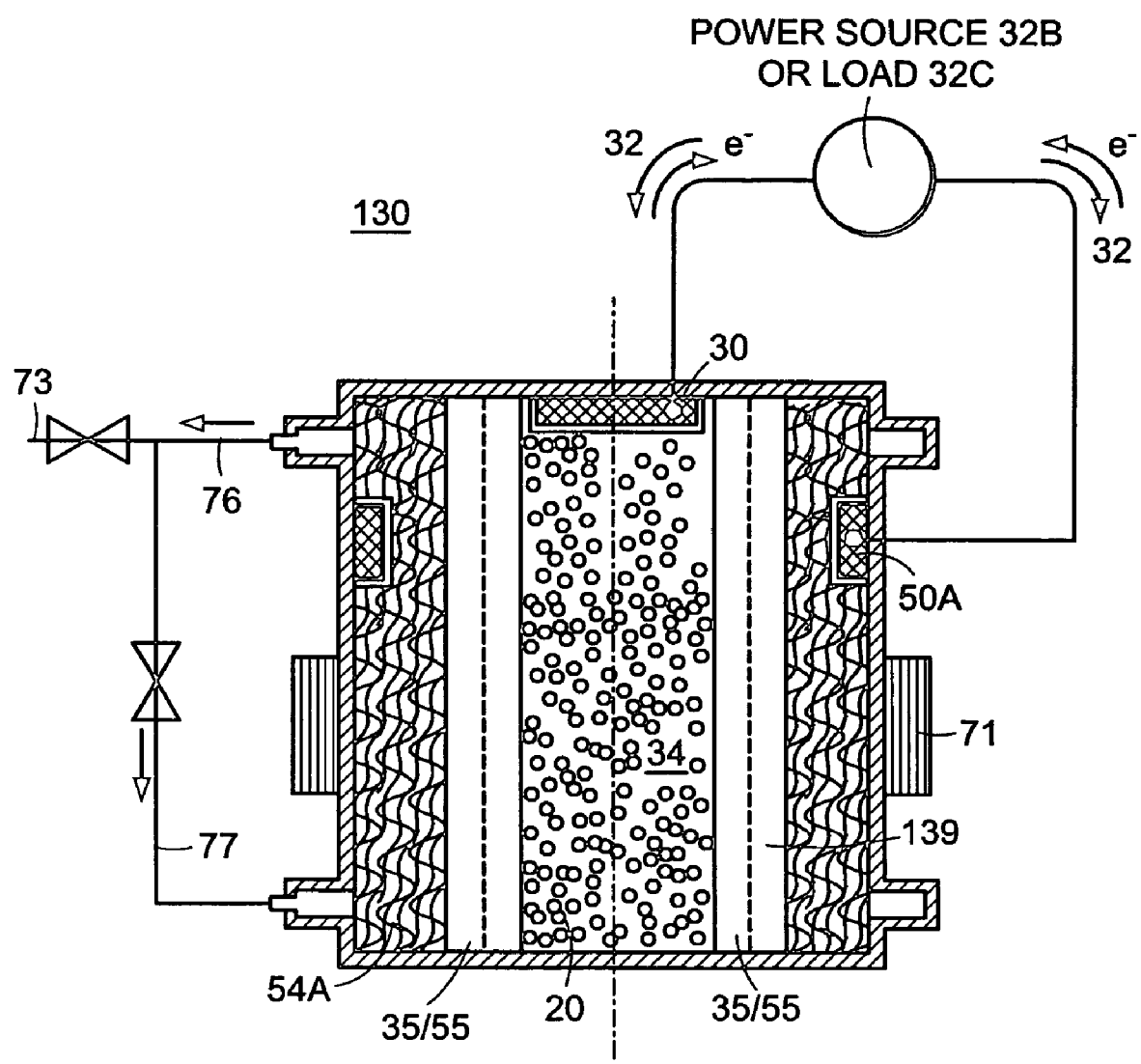
FIG. 14 illustrates an embodiment of the invention comprising a single electrolytic cell.

FIG. 14 illustrates an embodiment of the invention comprising a single electolytic cell, comprising a hydrogen-side electrode 34 comprising hollow microspheres 20 and electrode contact 30 and an oxygen-side electrode 54A. During a charging cycle hydrogen is formed at the hollow microspheres 20 and stored in the hollow regions 26. Oxygen is formed at electrode 54A and can be collected or vented using the oxygen connection 76. Electrolyte 35 and 55 can comprise KOH, and can freely mix within the electrolytic cell 130. Optionally, separators 139 such as membranes can be used to maintain some separation between different portions of the cell 130. After the microspheres 20 have been charged with hydrogen, oxygen can be added to the cell 130 using oxygen connection 77, and electrochemical reaction of the oxygen with hydrogen from the microspheres can produce electricity and water. A heater 71 can be employed in order to control the temperature of the cell. The cell can be charged by electron flow 32 forced by power source 32B to flow into electrode contact 30 from electrode contact 50A and discharged by electron flow 32 forced to flow from contact 30 to contact 50A through load 32C by the electromotive force of the cell's electrochemical reactions. A plurality of cells can be connected together to form a battery of cells.

The required oxidizer, such as oxygen, can be added in the form of gaseous oxygen (or air) using oxygen connection 73 as shown in the embodiment of FIG. 14, or it can be added by supplying an oxygen containing compound which can be dissolved into the electrolyte surrounding the oxygen-side electrode. Examples of such compounds useful as oxidizers are chlorates, such as $NaClO_4$ and $KClO_4$.

Figure 15:
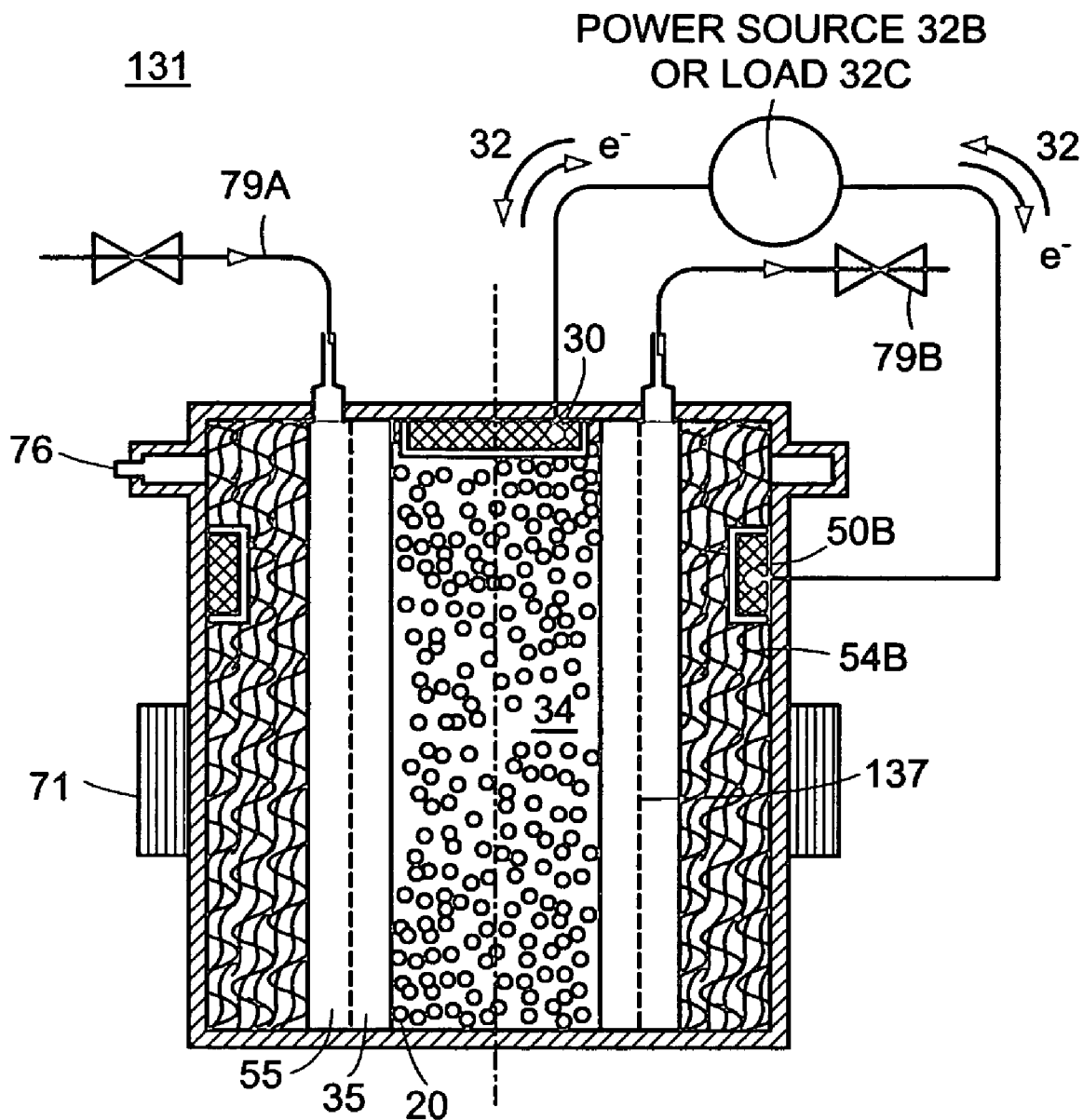
FIG. 15 illustrates an embodiment of the invention comprising a single electrolytic cell with a different type of oxygen-side oxidizer.

FIG. 15 illustrates an embodiment comprising a hydrogen-side electrode 34 comprising hollow microspheres 20 and electrode contact 30 and an oxygen-side electrode 54B that contains electrode contact 50B wherein an oxidizer is added to the oxygen-side electrolyte 55. During the charging cycle, hydrogen is formed at electrode 34 comprising the hollow microspheres 20 and stored in the hollow regions 26. Oxygen is formed at electrode 54B and can be collected or vented using the oxygen connection 76. Electrolytes 35 and 55 can comprise KOH, and are separated by a semi-permeable membrane 137. Membrane 137 can be any membrane commonly used to separate catholyte and anolyte mixtures and known in the art. After the microspheres 20 have been charged with hydrogen in a charging cycle, oxidizer can be added to cell 131 by using connections 79A and 79B to exchange the electrolyte 55 with fresh electrolyte containing the oxidizer. The oxidizer can be a chlorate such as $KClO_4$. Upon discharge, electrochemical reaction of the oxygen from the chlorate with hydrogen liberated from the microspheres can produce electricity and water. A heater 71 may be employed in order to control the temperature of the cell. The cell can be charged by current flow 32 forced by a power module, e.g., power source 32B, to flow to contact 30 from contact 50B, and discharged by current flow 32 forced through the power module, e.g., load 32C, from electrode contact 30 to contact 50B by the electromotive force of the cell electrochemical reactions. A plurality of cells can be connected together to form a battery of cells, for example, by using known techniques to arrange a plurality of single cells in parallel or series.

Figure 16:
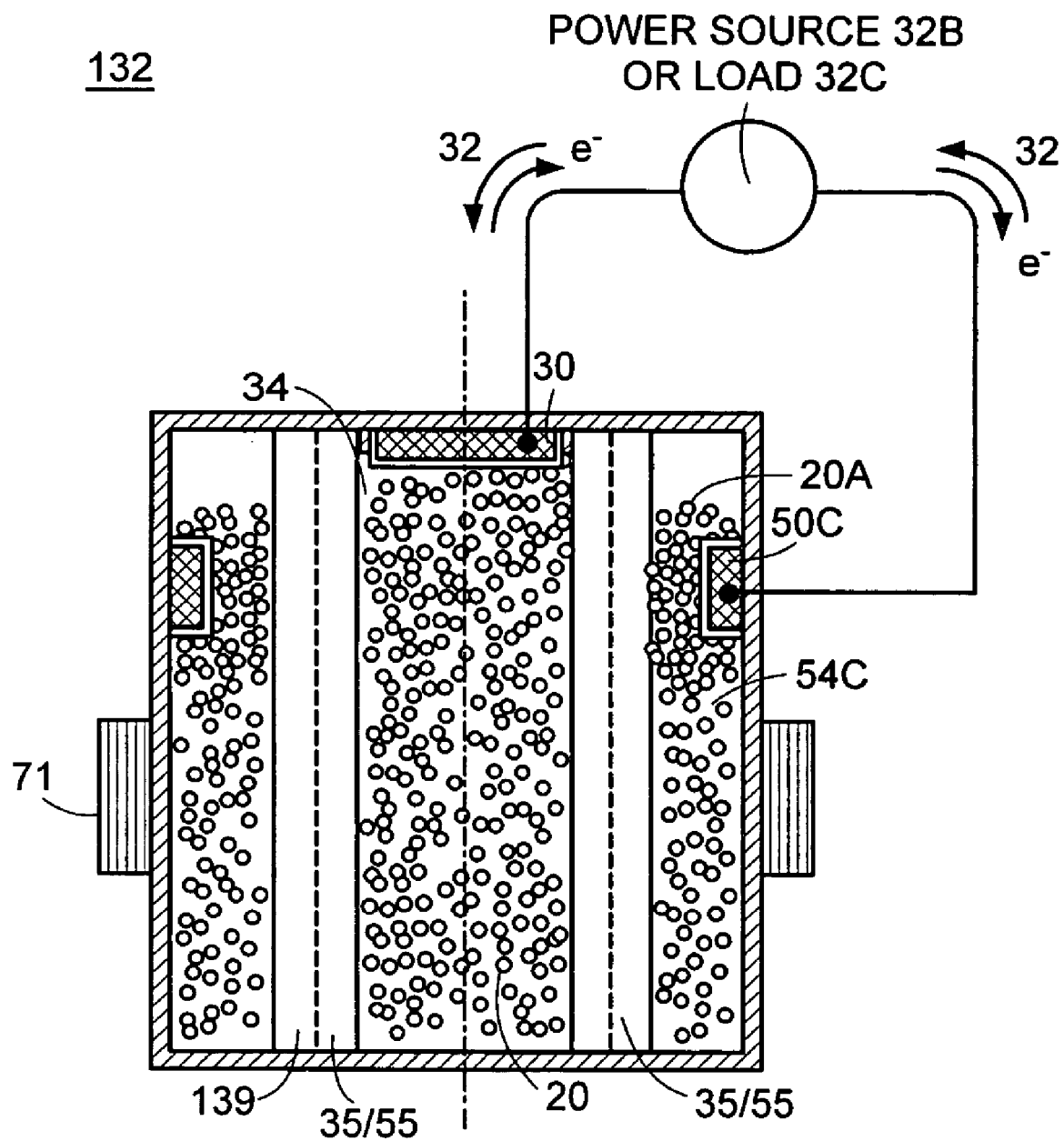
FIG. 16 illustrates an embodiment of the invention comprising a single electrolytic cell with hollow catalyst-coated microspheres used in both half-cells.

FIG. 16 represents an embodiment in which both electrodes are contained in a single chamber and the electrolyte is not pumped. This embodiment comprises a hydrogen-side electrode 34 including hollow microspheres 20 and electrode contact 30, and an oxygen-side electrode 54C that includes electrode contact 50C and hollow microspheres 20A. During the charging cycle hydrogen is formed at electrode 34, comprising the hollow microspheres 20, and stored in the hollow regions 26. Oxygen is formed at electrode 54C, comprising the hollow microspheres 20A, and stored in the hollow regions 26A. Electrolyte 35 and 55 can comprise KOH, and can freely mix within the electrolytic cell 132. Optionally, separators 139 (e.g., membranes) can be used to maintain some separation between different portions of the cell 132. Oxygen subsequently liberated from the microspheres 20A and hydrogen liberated from the microspheres 20 can combine to produce electricity and water, as described in FIG. 9. A heater 71 may be employed in order to control the temperature of the cell.

This cell can be charged by electron flow 32 from power source 32B, flowing from contact 30 to contact 50C. It can be discharged by electron flow 32 through load 32C flowing from electrode contact 30 to contact 50C, produced by the electromotive force of the cell's electrochemical reactions. Since all of the chemical reactants are contained within the cell, the cell may be hermetically sealed, providing allowances for variation in the electrolyte volume due to the reactions. A plurality of cells can be connected together to form a battery of cells.

Figure 17:
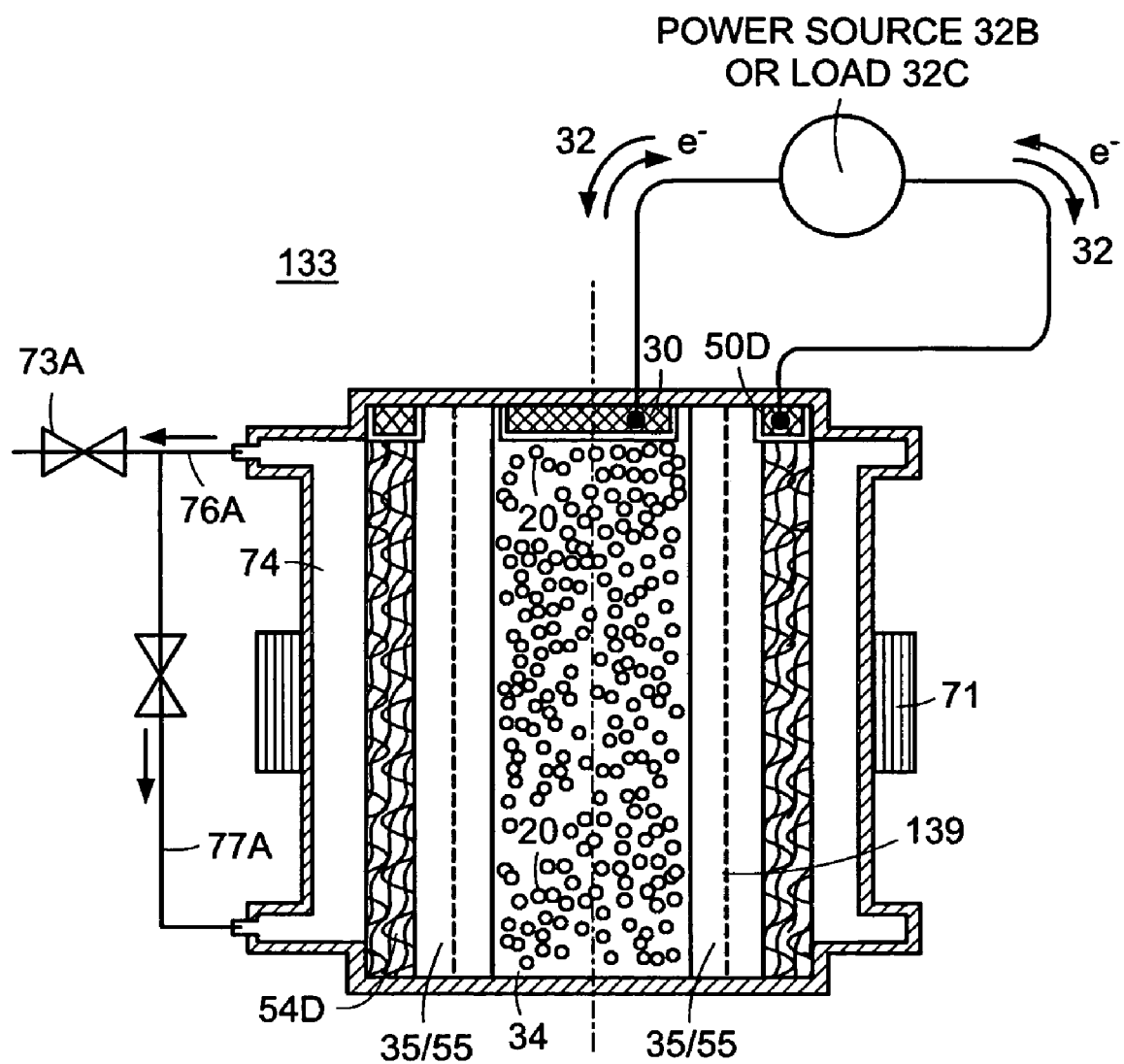
FIG. 17 illustrates an embodiment of the invention comprising an electrolytic cell with a different type of oxygen (air)-side electrode.

FIG. 17 illustrates an embodiment of the invention comprising an electrolytic cell of a generally cylindrical shape, including a center hydrogen-side electrode 34 disposed within surrounding oxygen-side electrode 54D. Hydrogen is formed by the techniques of the present invention, using the hollow microspheres 20 of electrode 34 and is stored in the hollow regions 26. Oxygen is formed on a gaseous diffusion electrode 54D and can be collected or vented using connection 76A. Temperature control unit 71 (e.g., a heater) is available to control and alter the temperature of the cell. Electrolytes 35 and 55 can comprise KOH, and can freely mix within the electrolytic cell 133. Optionally, separators 139 such as membranes commonly used in fuel cells and batteries can be used to separate different portions of cell 133. After the microspheres 20 have been charged with hydrogen, the cell contains a substantial amount of stored energy.

To discharge the cell, oxygen (or air) can be added to the cell 133 using the connection 77A from an oxygen (or air) supply 73A, which is connectable to plenum 74. The electrochemical cell reactions of the oxygen (or air) with hydrogen supplied from the hollow regions 26 of the microspheres 20 produces useable electricity and water as shown in FIG. 9. Water in the form of vapor can be vented off using connection 76A. The cell can be charged by electron flow 32 forced by power source 32B to flow to contact 30 from contact 50D and discharged by electron flow 32 forced through load 32C from electrode contact 30 to contact 50D by the electromotive force of the cell's electrochemical reactions. A plurality of cells can be connected together to form a battery of cells. If the electrolyte used in the electrochemical cell is alkaline, air from the ambient air source may require pretreatment, such as carbon dioxide scrubbing.

The high energy storage density achievable using the hollow microspheres can be used for other purposes. For example, the microspheres can be used to supply hydrogen to power rechargeable batteries with power capabilities several times greater than those previously available. The hollow microspheres can be used to store and release hydrogen, replacing the nickel metal hydride technology presently being used. The principles of the invention described above, relating for example, to water electrolysis and fuel cell operation, can also be applied to battery applications such as those described below.

A prior art nickel/metal hydride (NiMH) battery, such as those described in U.S. Pat. Nos. 6,440,607 and 6,445,196, commonly operates using the electrochemical reactions illustrated by the equations below.

| Cathode (negative): | $M + H_2O + e^- \rightarrow MH + OH^-$ |
| Anode (positive): | $Ni(OH)_2 + OH^- \rightarrow NiOOH + H_2O + e^-$ |

In these equations, Ni represents nickel and M is a hydrogen-absorbing metal hydride, comprising a metallic substance such as $LaNi_5$, known as a typical $AB_5$ hydrogen-absorbing compound. Many hydrogen-absorbing materials are known in the NiMH art, such as those described in U.S. Pat. Nos. 4,431,561 and 4,623,597 and 6,445,195. The anode side of this battery is typically comprised of nickel hydroxide $(Ni(OH)_2)$. Other similar, corresponding materials and reactions are also known, such as those that use silver oxide (AgO) as an anodic material. These reactions are reversible. The NiMH battery reactions are similar in some respects to the water electrolysis and fuel cell equations discussed above (FIGS. 8 and 9). In the charging cycle (the equations shown above) the cathode of the NiMH battery takes a hydrogen from water found in the electrolyte and stores it within the M (metal), forming MH. At the anode, hydrogen is removed from the nickel hydroxide, combines with hydroxyl ions formed at the cathode, and produces water.

When discharging, the cell is operated in the reverse direction (the above equations, operating from right to left), hydrogen from the metal hydride (MH) is removed, and water is formed. At the other electrode, hydroxyl ions are formed and the NiOOH gains hydrogen.

Thus, it can be understood that the metal compound (M) of the NiMH battery in the above equations has a hydrogen storage functionality analogous to that of the hollow microspheres described above. The M is acting as both a receiver and liberator of hydrogen. This functionality can be replaced with that of the hollow microspheres 20, discussed above. The metal-coated hollow microspheres 20 can be charged with hydrogen instead of forming MH from M at cathode. Similarly, when acting as an anode and producing hydrogen, the metal-coated hollow microspheres can fulfill this need, in place of obtaining hydrogen from the MH to M reaction. As discussed below, embodiments of the invention include metal-coated microspheres 20 interspersed with hydrogen-absorbing materials. For example, the catalyst coating of composite material assemblies can advantageously include metal hydrides such as NiMH, or other such materials.

Since hydrogen supply is a major limitation in battery life, an increased hydrogen storage supply prolongs the life of a battery and increases the amount of power that can be produced for each charging cycle. Accordingly, the high energy storage density of the metal-coated microspheres 20 can thus provide substantially more stored energy per charging cycle than NiMH batteries. Estimates indicate that a battery of a given weight using hollow microspheres charged with hydrogen to 6,000 psi may store an amount of energy equivalent to six batteries of the prior art.

Figure 18:
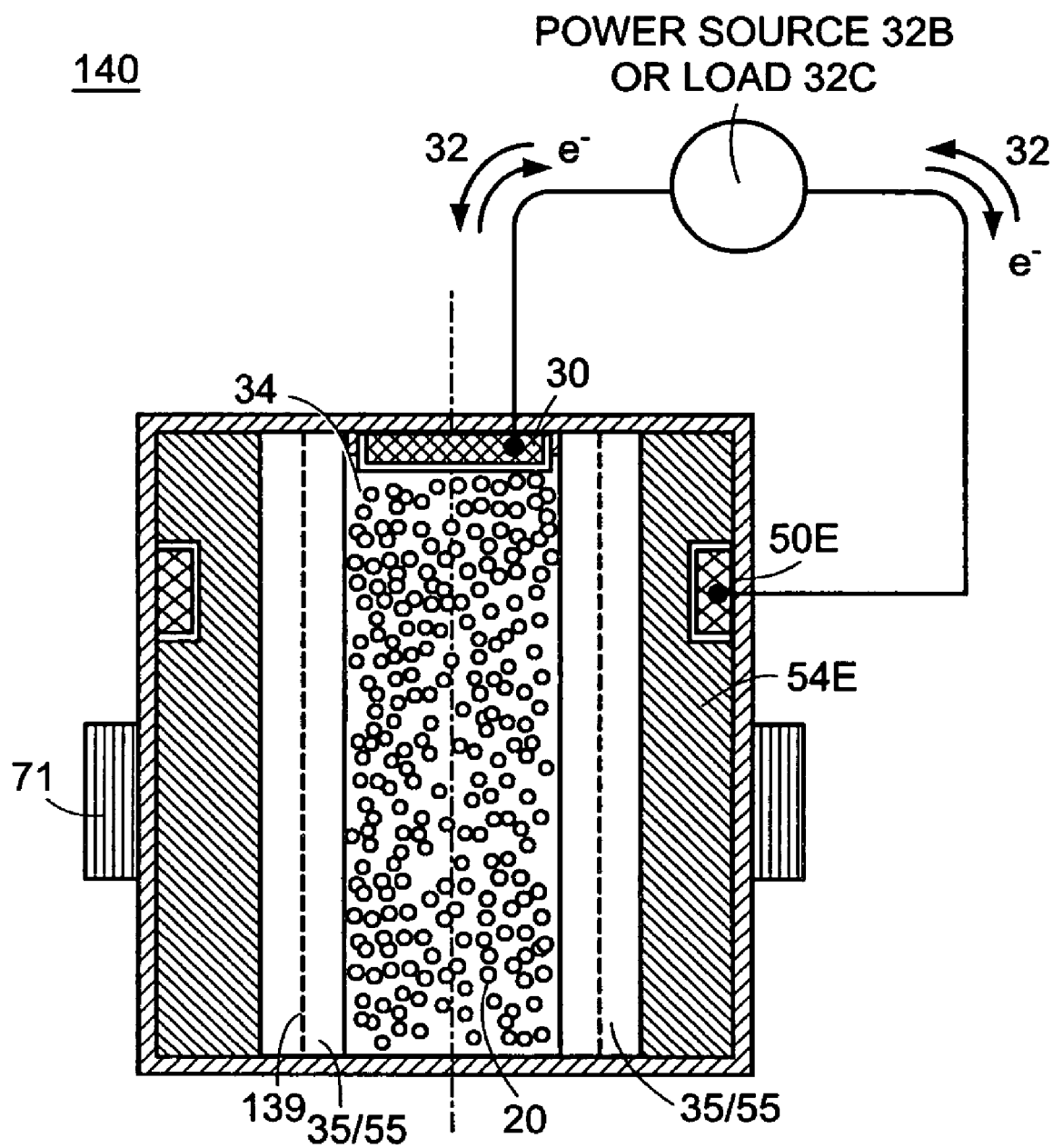
FIG. 18 is an illustration of an embodiment of the invention comprising a NiMH battery cell comprising catalyst-coated hollow microspheres of the invention.

FIG. 18 shows an embodiment of a battery comprising electrochemical catalyst-coated hollow microspheres storage technology of this invention. Hollow catalyst-coated microspheres 20 are used as an electrode 34 for the hydrogen side of the battery 140. The microspheres can be coated with a silver/palladium or nickel/palladium catalyst to catalyze the hydrogen conversion reactions described above. Rather than forming MH during charging, the hydrogen is formed then stored within the hollow regions 26 of the microspheres 20 as previously described. Hydrogen can be stored within the hollow regions 26 at great pressure, limited only by the structural strength of the microspheres. Pressures on the order of 10,000 to 20,000 psi, and more, are possible. The opposite electrode 54E of the apparatus comprises a common nickel hydroxide electrode, according to the reversible equation above. One such positive electrode is described in U.S. Pat. No. 5,344,728. During charging hydrogen is formed and stored within the microspheres 20. When charging electron flow 32 is driven to electrode contact 30 from electrode contact 50E of electrode 54E by power source 32B. Embodiments include use of temperature control unit 71, such as a heater, to alter the temperature of the battery 140.

When producing electricity, the current flow is reversed and hydrogen is liberated from the microspheres 20. The liberated hydrogen combines with the hydroxyl ions to form water, which combine with the NiOOH at the cathode and producing $Ni(OH)_2$. When discharging electron flow 32 is driven through load 32C from the electrode contact 30 to electrode contact 50E by the electromotive force of the electrochemical reactions of the cell. Recirculation of electrolyte 35/55 is not required in this embodiment of the invention. However, other embodiments include dual chamber (such as chambers 33 and 53 above) and recirculation systems. Optionally, separators 139 such as membranes can be used to separate portions of the battery as previously described. A plurality of cells can be connected together to form a battery of cells, for example, by using known techniques to arrange a plurality of single cells in parallel or series to provide or receive an increased amount of current or voltage, respectively.

Figure 18A:
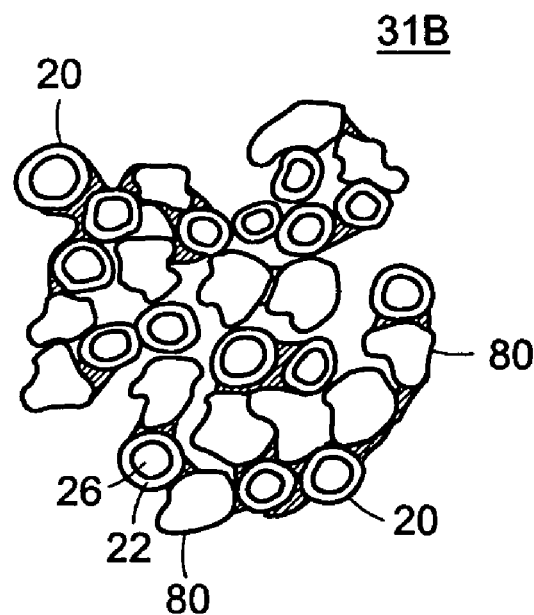
FIG. 18A is and illustration of a portion of an electrode for a NiMH battery cell.
Figure 18B:
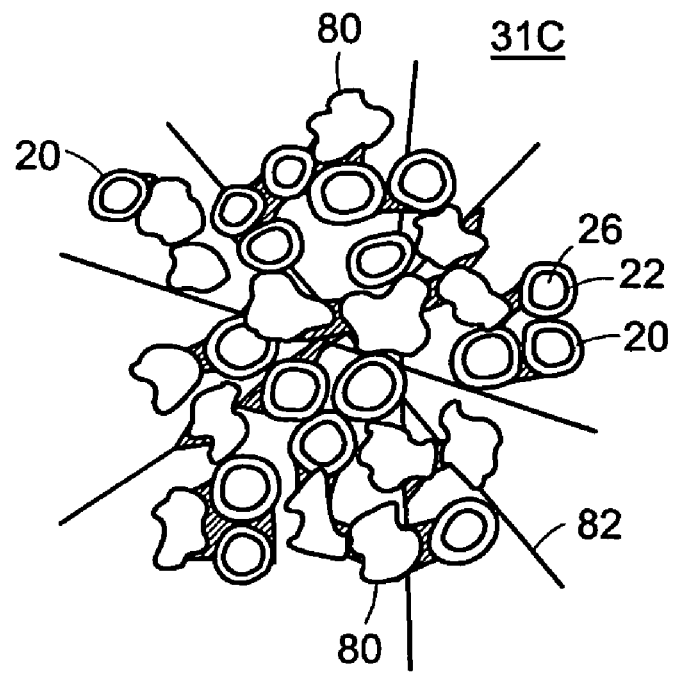
FIG. 18B is an illustration of a portion of another type of electrode for a NiMH battery cell.

Battery cells in all types of physical form are possible such as prismatic and spiral wound, as known to the skilled artisan. Other embodiments include the use of a hydrogen side electrode that includes a mixture of both the nickel hydride type hydrogen absorbing material of current NiMH batteries and the catalyst coated hollow microbubble gaseous storage material of the present invention. This embodiment has the advantage of the very high energy storage capability of the hollow microspheres and the quick hydrogen release capability of the metal hydrides. This allows for high current surge or demand and or random cyclical power drain. In operation the hydrogen charged catalyst coated hollow microspheres will tend to recharge the drained hydrides with hydrogen migrating from the microspheres to zones of lower concentration These electrodes can be fabricated by any known technique and may include both sintered and non-sintered types, for example, resulting in a non-sintered matrix. Schematics of portions of welded (sintered) electrodes are shown in FIGS. 18A and 18B. FIG. 18A shows a portion of the electrode 31B with the hydride storage material 80 and the catalyst coated hollow microbubbles 20 welded (sintered) together. FIG. 18B shows a portion of the electrode 31C with the hydride storage material 80 and the catalyst coated hollow microbubbles 20 sintered together with the addition of a nickel foam material 82 additionally welded to the other materials.

Creating, storing, and providing hydrogen according to the embodiments described has many advantages. Safe storage of volatile and flammable hydrogen gas is achieved using the microspheres, due to the encapsulation and partitioning of the stored gas. A small equipment rupture does not result in a large flammable gas relief or a devastating explosion. Hydrogen can be stored within the microspheres at very high pressures without bulky and expensive high-pressure storage vessels and associated peripheral equipment.

Furthermore, high energy-storage densities (i.e., the amount of energy stored per unit weight) are achievable, as well as the amount of energy stored per unit volume. Energy densities approaching that of liquid hydrogen can be achieved, enabling embodiments to be used for mobile applications such as laptop computers, portable power equipment, and automobiles. Hydrogen storage pressures of greater than 10,000 psi within the composite material assemblies (e.g., the microspheres) can be realized, without the use of expensive and trouble-prone hydrogen compression equipment. These benefits are achieved at low to moderate operating temperatures. Operating temperatures can range from −50 and 350° C., although satisfactory high output performance is achievable when operating between −50 and 200° C.

Moreover, the invention is immensely scalable. Embodiments comprising fuel cells can be arranged in series to provide high voltages. Each hydrogen/oxygen cell generates approximately 1.23 volts. Thus, 10 cells in series can provide 12.3 volts, etc. The fuel cells can also be arranged in parallel to provide current flows of over 1000 amps.

The hollow microspheres overcome the membrane pressure differential problems found in former fuel cell technologies (FIG. 1). Pressure gradient issues preventing uniform gas flow into fuel cell electrolyte solutions have also been overcome. This problem is overcome in part because the small diameters of the hollow microspheres ensure that no significant head differential exists between the top and bottom portions of each microsphere. Further, the chambers of fuel cell embodiments can use vertical gas flow paths (e.g., FIG. 10). Since microspheres 20, 20A, and 40 are exposed to gases such as hydrogen and oxygen with a vertical gas flow orientation, instead of with the horizontal gas flow orientation of FIG. 1, no pressure gradient problem is experienced. Embodiments include fuel cells of great height.

Embodiments have been described referring to a hydrogen side and an oxygen side of an electrochemical apparatus. These descriptions are merely for purposes of explanation and for convenience, and represent only some of the embodiments. It should be realized that various other chemical reactions and combinations can be performed using the invention and that, for example, the use of hollow or solid microspheres for the purposes described is not limited to a specific type of chemical element or compound, and that either or both hollow or solid microspheres can be used with a particular chemical element or compound.

I claim:

1. A composite material assembly for reversibly transferring a gaseous element comprising:
a base-material at least partially coated with a catalyst and at least partially permeable to the gaseous element and defining at least one hollow region consisting essentially of a pressurized gas.

2. The composite material of claim 1 wherein transferring the gaseous element comprises releasing and/or storing the gaseous element.

3. The composite material assembly of claim 1 wherein the catalyst comprises at least one of nickel, palladium, silver, platinum, copper, gold, titanium, silicon, iron, aluminum, indium, gallium, niobium, tantalum, vanadium, molybdenum, tungsten, zirconium, cobalt, chromium, carbon, cadmium, beryllium, rhenium, rhodium, rubidium, or alloys thereof.

4. The composite material assembly of claim 1 wherein a plurality of composite material assemblies are at least one of sintered or welded together.

5. The composite material assembly of claim 1 wherein the base-material has a size range of between 5 and 5000 microns.

6. The composite material assembly of claim 1 wherein the base-material comprises a microbubble.

7. The composite material assembly of claim 6 wherein the microbubble has a diameter size range between 5 and 5000 microns.

8. The composite material assembly of claim 6 wherein the microbubble has a wall thickness range between 0.10 and 100 microns.

9. The composite material assembly of claim 1 further comprising at least one of aluminum, silicon, zirconium, carbon, and boron.

10. The composite material assembly of claim 1 wherein the base-material comprises a glass.

11. The composite material assembly of claim 10 wherein the glass comprises at least one of vitreous silica, vitreous germania, vitreous boric oxide, titanium silicate, aluminosilicate, alkali silicate, alkaline earth silicate, alkaline earth germinate, alkali borate, borosilicate, alkali aluminosilicate, alkali galliosilicate, soda-lime silicate, alkali borosilicate, phosphate, including natural and commercial grades.

12. The composite material assembly of claim 1 wherein the base-material comprises a glass-ceramic.

13. The composite material assembly of claim 12 wherein the glass-ceramic comprises a microbubble.

14. The composite material assembly of claim 12 wherein the glass-ceramic comprises at least one of lithium aluminosilicate, lithium silicate, lithium metasilicate, lithium disilicate, or zinc silicate.

15. The composite material assembly of claim 14 wherein the ceramic comprises a microbubble.

16. The composite material assembly of claim 1 wherein the base-material comprises a ceramic.

17. The composite material assembly of claim 15 wherein the ceramic comprises at least one of alumina, zirconia, yttria, silica alumina, mullite, sillimanite, porcelain, and a polycrystalline material.

18. The composite material assembly of claim 1 wherein the coating is formed by a coating process including at least one of chemical vapor deposition, electroplating, electroless plating, sol gel, plasma-activated chemical vapor deposition, sputtering, and painting.

19. The composite material assembly of claim 1 wherein the permeability is controllably altered by at least one of pressure and temperature.

20. The composite material assembly of claim 1 wherein a rate of transfer of the gaseous element is enhanced by surface modifications to the coating.

21. An electrode for reversibly transferring a gaseous element, comprising:
a plurality of composite material assemblies each comprising an at least partially catalyst-coated base-material, the base-material at least partially permeable to the gaseous element and defining at least one hollow region consisting essentially of a pressurized gas, wherein the plurality of composite material assemblies is at least partially electrically interconnected.

22. The electrode of claim 21 further comprising a hydrogen-absorbing material interspersed therewith.

23. The electrode of claim 22 wherein the hydrogen-absorbing material comprises a metal hydride.

24. The electrode of claim 21 wherein the catalyst coating comprises at least one of nickel, palladium, silver, platinum, copper, gold, titanium, silicon, iron, aluminum, indium, gallium, niobium, tantalum, vanadium, molybdenum, tungsten, zirconium, cobalt, chromium, carbon, cadmium, beryllium, rhenium, rhodium, rubidium, or alloys thereof.

25. The electrode of claim 21 wherein the plurality of composite material assemblies are at least one of sintered or welded together.

26. The electrode of claim 21 wherein the composite material assemblies are combined to form a non-sintered matrix.

27. The electrode of claim 21 wherein the gaseous element is hydrogen.

28. The electrode of claim 21 wherein the gaseous element is oxygen.

29. An apparatus for transferring a gaseous element, comprising:
a plurality of composite material assemblies including an at least partially catalyst-coated base-material, the base-material being at least partially permeable to the gaseous element and defining at least one hollow region consisting essentially of a pressurized gas, the plurality of composite material assemblies at least partially electrically interconnected;

an electrolyte comprising the gaseous element; and a power module in electrical communication with the plurality of composite material assemblies, wherein induced electrochemical reactions involving the gaseous element, the catalyst, the power module, and the electrolyte cause the gaseous element to either accumulate in or be liberated from the hollow region.

30. The apparatus of claim 29 further comprising: a pressurizeable environment, wherein a pressure of the gaseous element within the pressurizeable environment is periodically adjusted such that the gaseous element accumulates in or is liberated from the hollow region.

31. The apparatus of claim 29 wherein the base-material is at least partially permeable to hydrogen.

32. The apparatus of claim 29 wherein the gaseous element is hydrogen.

33. The apparatus of claim 29 wherein the apparatus is an electrochemical half-cell.

34. The apparatus of claim 29 wherein the gaseous element is oxygen.

35. The apparatus of claim 29 wherein the transfer of the gaseous element is enhanced by chemical additions to the electrolyte.

36. A gaseous storage rechargeable electrochemical cell comprising:

a housing;

an electrolyte disposed in the housing and comprising a first gaseous element;

a first electrode disposed within the housing and in contact with the electrolyte, wherein the first electrode comprises a plurality of composite material assemblies, each assembly comprising an at least partially catalyst-coated base-material at least partially permeable to the first gaseous element and defining at least one first hollow region consisting essentially of a pressurized gas, the plurality of assemblies at least partially electrically interconnected; and a power module in at least partial electrical communication with the plurality of composite material assemblies, such that induced electrochemical reactions at the first electrode involving a first gaseous element, the catalyst, the power module, and the electrolyte, cause the first gaseous element to either accumulate in or be liberated from the first hollow region.

37. The electrochemical cell of claim 36 further comprising: a second electrode disposed within the housing in a spaced relationship relative to the first electrode, the second electrode comprising a second plurality of composite material assemblies, each comprising an at least partially catalyst-coated base-material at least partially permeable to a second gaseous element and defining at least one second hollow region for storage of the second gaseous element, the second plurality of assemblies at least partially electrically interconnected; and a power module in at least partial electrical communication with the second plurality.

38. The electrochemical cell of claim 37 the second gas is oxygen.

39. The electrochemical cell of claim 37 wherein the electrochemical cell is a rechargeable battery.

40. The electrochemical cell of claim 37 wherein the second electrode comprises a mixture including nickel as a major component, the mixture disposed on an at least partially electrically conductive interconnected substrate that is in at least partial electrical communication with the power module.

41. The electrochemical cell of claim 37 wherein the second electrode comprises: a oxygen electrode disposed within the housing in a spaced relationship relative to the first electrode and the housing, the positive oxygen electrode on one side being exposed through an electrolyte to the first electrode and on the opposite side to gaseous oxygen through a supply port in the housing, the oxygen electrode including an electrode mixture which contains an oxygen reduction catalyst present in an electrochemically active amount, the mixture disposed on or within an at least partially electrically conductive interconnected substrate in at least partial electrical communication with the power module.

42. The electrochemical cell of claim 41 wherein the second electrode is exposed to ambient air.

43. The electrochemical cell of claim 36 wherein the first gas is hydrogen.

44. The electrochemical cell of claim 36 wherein the first electrode comprises a mixture including nickel as a major component, the mixture disposed on an at least partially electrically conductive interconnected substrate that is in at least partial electrical communication with the power module.

45. The electrochemical cell of claim 36 wherein the first electrode includes inter-dispersing a hydrogen-absorbing material therewith.

46. The electrochemical cell of claim 45 wherein the hydrogen-absorbing material comprises a metal hydride.

47. The electrochemical cell of claim 36 wherein the transfer of the gaseous element is enhanced by chemical additions to the electrolyte.

48. The electrochemical cell of claim 36 wherein a rate or magnitude of side surface reactions is controllably altered by chemical additions to the electrolyte.

49. The electrochemical cell of claim 36 wherein a rate or magnitude of side surface reactions is controllably altered by adjustment of a cell pressure or temperature.

50. The electrochemical cell of claim 36 wherein a plurality of cells are electrically connected to each other in parallel or series to provide or receive an increased amount of current or voltage.

51. The electrochemical cell of claim 36 wherein the electrolyte is a basic electrolyte.

52. The electrochemical cell of claim 51 wherein the basic electrolyte comprises an alkali metal hydroxide.

53. The electrochemical cell of claim 52 wherein the basic electrolyte comprises potassium hydroxide.

54. The electrochemical cell of claim 51 wherein the basic electrolyte is at least one of a liquid or a gel or a solid.

55. The electrochemical cell of claim 36 wherein the electrolyte is an acidic electrolyte.

56. The electrochemical cell of claim 55 wherein the acidic electrolyte is at least one of a liquid or a gel or a solid.

57. The electrochemical cell of claim 36 wherein the electrolyte is circulated within the housing using a pump.

58. The electrochemical cell of claim 36 comprising a conductive matrix that includes at least one composite material assembly in contact with or comprising at least one of conductive foam, metal wire mesh, perforated metal foil, metal gauze, metallic foam or felt, and a perforated metallic sheet.

59. The electrochemical cell of claim 58 wherein the conductive matrix includes a conductive material additive comprising at least one of nickel, copper, carbon, silver, or alloys, mixtures, or compounds thereof.

60. The electrochemical cell of claim 58 wherein the conductive matrix includes at least one of sintering or welding constituents together.

61. The electrochemical cell of claim 36 wherein an operating temperature within the housing is periodically maintained between −50 degrees Celsius and 1000 degrees Celsius.

62. The electrochemical cell of claim 36 wherein an operating pressure within the housing is periodically maintained between 1 Bar and 2000 Bar.

63. The electrochemical cell of claim 36 wherein the housing further comprises a demister.

64. A method of gaseous element transfer comprising:
providing a composite material assembly including a base-material at least partially coated with a catalyst and at least partially permeable to the gaseous element, defining one or more hollow regions consisting essentially of a pressurized gas; and
transferring a gaseous element into or out of the hollow region.

65. The method of claim 64 wherein the composite material assembly is a part of an electrochemical cell.

66. The method of claim 65 wherein electrical energy and water are generated by the cell operating when the hydrogen and the oxygen are consumed in the electrochemical reactions upon being liberated from the hollow regions.

67. The method of claim 65 wherein electrical energy and water are consumed by operation of the electrochemical cell, at least one of hydrogen and oxygen being generated in an electrochemical reaction and accumulated in the one or more hollow regions.

68. The method of claim 64 wherein the composite material assembly comprises hollow glass microspheres at least partially permeable to the gaseous element.

69. The method of claim 64 wherein the composite material assembly is at least partially disposed in an electrolyte.

70. The method of claim 64 wherein the transfer of gaseous element is facilitated with an electron source or sink.

71. The method of claim 64 wherein the permeability is controllably altered by chemical additions to the base-material.

72. The method of claim 64 wherein the permeability is controllably altered by operational changes to at least one of a pressure or a temperature about the composite material assembly.

73. The method of claim 64 wherein a rate of the gaseous transfer is enhanced by surface modifications to the coating.

74. The method of claim 64 wherein electrical energy is generated by transfer of the gaseous element from the one or more hollow regions and subsequent consumption of the gaseous element in electrochemical reactions.

75. The method of claim 64 wherein electrical energy is consumed by transfer of the gaseous element to the one or more hollow regions, subsequent to the gaseous element being generated in an electrochemical reaction.

76. The method of claim 64 wherein the composite material assembly is pressurized with gaseous hydrogen to an absolute pressure between 1 Bar and 2000 Bar.

77. The method of claim 64 wherein the composite material assembly is pressurized with gaseous oxygen to an absolute pressure between 1 Bar and 2000 Bar.

78. The method of claim 64 further comprising periodically maintaining an operating absolute pressure within electrolyte surrounding the composite material assembly between 1 Bar and 2000 Bar.

79. The method of claim 64 wherein periodically induced electrochemical reactions are controlled by periodic electrical communication between an electrode and a power module.

* * * * *